United States Patent
Ishizaki et al.

(10) Patent No.: US 9,458,871 B2
(45) Date of Patent: Oct. 4, 2016

(54) STRUCTURE FOR SHAFT, MALE MEMBER, AND FEMALE MEMBER

(71) Applicant: NITTA CORPORATION, Osaka (JP)

(72) Inventors: Yoji Ishizaki, Nara (JP); Yoshiharu Kiyohara, Nara (JP); Katsuyuki Nakai, Nara (JP); Kenichiro Aoki, Nara (JP); Yasuhiro Aoki, Nara (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 14/734,945

(22) Filed: Jun. 9, 2015

(65) Prior Publication Data

US 2015/0275946 A1  Oct. 1, 2015

Related U.S. Application Data

(63) Continuation of application No. PCT/JP2013/083152, filed on Dec. 11, 2013.

(30) Foreign Application Priority Data

Dec. 13, 2012 (JP) .................................. 2012-272886
Dec. 5, 2013 (JP) .................................. 2013-251755

(51) Int. Cl.
  F16D 7/00 (2006.01)
  F16B 7/00 (2006.01)
  (Continued)

(52) U.S. Cl.
  CPC . *F16B 7/00* (2013.01); *B62D 1/16* (2013.01); *B62D 1/20* (2013.01); *F16D 1/06* (2013.01); *F16D 3/06* (2013.01); *F16D 3/12* (2013.01); *Y10T 403/7026* (2015.01)

(58) Field of Classification Search
  CPC ............ B62D 1/16; B62D 1/18; B62D 1/20; Y10T 403/7026; Y10T 403/5733; F16D 3/06; F16D 3/10; F16D 3/12; F16D 1/06; F16C 3/03; F16C 2226/80; F16B 7/00; F16B 7/02; F16B 7/025

USPC ....................................................... 464/75, 97
See application file for complete search history.

(56) References Cited

U.S. PATENT DOCUMENTS 3,984,997 A * 10/1976 Dossier ................. F16D 43/211
                                                      464/60
4,445,606 A *  5/1984 Van Laningham ... F16D 27/112
                                                      192/200
(Continued)

FOREIGN PATENT DOCUMENTS

DE   102009038316 A1 *  2/2011 ............ B23P 11/005
JP       58-057518              4/1983
(Continued)

*Primary Examiner* — Jonathan Masinick
(74) *Attorney, Agent, or Firm* — Seed IP Law Group PLLC

(57) ABSTRACT

A shaft structure including: a male component having male spline parts and male spline bottom parts on an outer peripheral part; a female component having female spline parts and female spline bottom parts on an inner peripheral part configured to allow the male component to be slidably inserted in an axial direction; and an elastic member arranged on the male component covering a surface of the outer peripheral part of the male component, wherein, in an initial state where the male component is inserted into the female component, the female and male components have first gaps between: sides of the female spline parts; and sides-facing portions of the elastic member, and when the male component is rotated, a time from the initial state to a state where the sides of the female spline parts abut on the portions of the elastic member, has predetermined time differences along the axial direction.

32 Claims, 33 Drawing Sheets

(51) Int. Cl.
  *B62D 1/20* (2006.01)
  *F16D 1/06* (2006.01)
  *F16D 3/06* (2006.01)
  *F16D 3/12* (2006.01)
  *B62D 1/16* (2006.01)

(56) References Cited

U.S. PATENT DOCUMENTS

| | | | | |
|---|---|---|---|---|
| 4,493,407 A | * | 1/1985 | Newton | F16D 13/686 |
| | | | | 192/200 |
| 4,659,069 A | * | 4/1987 | Odobasic | B64C 25/64 |
| | | | | 244/104 R |
| 5,672,111 A | * | 9/1997 | Schremmer | B62D 1/16 |
| | | | | 403/359.6 |
| 6,283,867 B1 | * | 9/2001 | Aota | F16D 3/68 |
| | | | | 464/158 |
| 7,497,783 B2 | * | 3/2009 | Azuma | F16C 3/03 |
| | | | | 464/162 |
| 2009/0291001 A1 | * | 11/2009 | Neuroth | E21B 4/006 |
| | | | | 417/410.1 |
| 2011/0209961 A1 | * | 9/2011 | Yamamoto | F16D 1/101 |
| | | | | 192/3.28 |

FOREIGN PATENT DOCUMENTS

| | | |
|---|---|---|
| JP | 2008-120250 | 5/2008 |
| JP | 2010-181011 | 8/2010 |

\* cited by examiner (a)

(b)

(a)

(b)

(a)

(b)

(a)

(b)

(a)

(b)

STRUCTURE FOR SHAFT, MALE MEMBER, AND FEMALE MEMBER

CROSS REFERENCE TO RELATED APPLICATIONS

This is a continuation application of International Patent Application No. PCT/JP2013/083152 filed on Dec. 11, 2013 claiming priority upon Japanese Patent Application Nos. 2012-272886 and 2013-251755 filed on Dec. 13, 2012 and Dec. 5, 2013, respectively, of which full contents are incorporated herein by reference.

BACKGROUND OF THE INVENTION

1. Field of the Invention

The present invention relates to a shaft structure to be installed in shafts used for various industrial machines, and a male component and a female component included in the shaft structure.

2. Description of the Background Art

Conventionally, there have been publicly well-known telescopic shafts each including male and female spline shafts to be incorporated into vehicle steering shafts (see FIG. 2 in Patent Document 1). Such a telescopic shaft has splines formed on an outer surface of the male spline shaft and an inner surface of the female spline shaft. Furthermore, an approximately 0.25 mm thick synthetic resin (nylon or the like) coating is formed on either of the outer surface of the male spline shaft or the inner surface of the female spline shaft.

PRIOR ART DOCUMENTS

Patent Documents

Patent Document 1: Japanese Patent Application Publication No. 2008-120250

Problem to be Solved

In the telescopic shaft described in Patent Document 1, however, since a pressure area for which the outer surface of the male spline shaft presses the inner surface of the female spline shaft through the resin coating is large, an initial stiffness developed when the male spline shaft is rotated (the stiffness is defined as a stiffness developed until the resin coating completes transformation, or a stiffness developed until the resin coating completes absorption of a pressure from the male spline shaft) is high. As a result, there has been a problem that an operator, who is handling a steering wheel, suffers from abnormal feelings because a large torque is suddenly transmitted from the telescopic shaft to the steering wheel when an electric motor is energized. More specifically, there has been a problem that, immediately after the operator starts handling the steering wheel, the force required for the operator to handle the steering wheel decreases drastically, which causes the operator to suffer from abnormal feelings.

SUMMARY OF THE INVENTION

The objective of the present invention is to provide a shaft structure, a male component, and a female component capable of further reducing an initial stiffness developed at a time when the male component is rotated, in comparison with a conventional one, so as to suppress a sudden transmission of a large power to the shaft, thereby enabling the reduction of abnormal feelings suffered from by an operator.

Means for Solving Problems

[1] A shaft structure according to the present invention is characterized in that said shaft structure is installed in a shaft capable of making a power-transmission, and that said shaft structure comprises: a male component having a plurality of male spline parts and a plurality of male spline bottom parts formed on an outer peripheral part thereof; a female component having a plurality of female spline parts and a plurality of female spline bottom parts formed on an inner peripheral part thereof, the female component configured to allow the male component to be slidably inserted thereinto in an axial direction thereby making up said shaft structure; and an elastic member arranged on the male component such that a surface of the outer peripheral part of the male component is covered with the elastic member, wherein said shaft structure is configured such that in an initial state where the male component is inserted into the female component, the female and male components have first gaps generated between: sides of the plurality of female spline parts; and sides-facing portions of the elastic member, and when the male component is rotated with respect to the female component, a period of time, which elapses from the initial state to a state where the sides of the plurality of female spline parts and the portions of the elastic member abut on each other, has predetermined time differences along the axial direction.

[2] A male component according to the present invention is characterized in that said male component is installed in a shaft capable of making a power-transmission, and that said male component comprises: a plurality of male spline parts formed on an outer peripheral part thereof; a plurality of male spline bottom parts on an outer peripheral part thereof; and an elastic member arranged thereon such that a surface of outer peripheral parts of the plurality of male spline parts and the plurality of male spline bottom parts is covered with the elastic member, wherein said male component is configured to be inserted into a female component in an axial direction thereby making up a shaft structure, the female component having a plurality of female spline parts and a plurality of female spline bottom parts formed on an inner peripheral part thereof, and wherein said male component is further configured such that in an initial state where said male component is inserted into the female component, the female component and said male component have first gaps generated between: sides of the plurality of female spline parts; and sides-facing portions of the elastic member, and when said male component is rotated with respect to the female component, a period of time, which elapses from the initial state to a state where the sides of the plurality of female spline parts and the portions of the elastic member abut on each other, has predetermined time differences along the axial direction.

According to the construction of [1] or [2] above, when the male component is rotated with respect to the female component in the initial state where the male component is inserted into the female component, the sides of the plurality of female spline parts and the elastic member (more specifically, the sides of the plurality of male spline parts covered with the elastic member) abut on each other with predetermined time differences along the axial direction, thereby enabling the initial stiffness (the stiffness developed until the elastic member completes transformation, or the stiffness developed until the elastic member completes absorption of a pressure from the sides of the plurality of female spline parts) to increase gently. Consequently, the initial stiffness developed at a time when the male component is rotated can be further reduced, in comparison with a conventional one, so as to suppress a sudden transmission of a large power to the shaft, thereby capable of preventing the operator's abnormal feelings.

[3] In the shaft structure as one aspect of [1] above or the male component as one aspect of [2] above, it is preferable that the first gaps are generated such that a clearance between the sides of the plurality of female spline parts and the elastic member (more specifically, the sides of the plurality of male spline parts covered with the elastic member) is different along a direction in which the male component is inserted into the female component. More specifically, it is preferable that the first gaps are generated such that a clearance between the sides of the plurality of female spline parts and the sides-facing portions of the elastic member increases or decreases with increase in depth in an insertion direction.

According to the construction of [3] above, an elapsed period of time until the sides of the plurality of female spline parts abut on the elastic member (more specifically, the sides of the plurality of male spline parts covered with the elastic member) in the initial state where the male component is inserted into the female component can be made longer or shorter with increase in depth along the insertion direction of the male component. Accordingly, when the male component is rotated, the sides of the plurality of male spline parts press the sides of the plurality of female spline parts through the elastic member with predetermined time differences along the insertion direction, thereby capable of surely achieving the advantageous effects of increasing gently in the initial stiffness.

[4] In the shaft structure or the male component as one aspect of [3] above, it is preferable that the male component further comprises: a first main body formed at a front side to have a substantially constant diameter while extending in a direction from a front end to a back end; a second main body formed at a back side to have a substantially constant diameter smaller than a diameter of the first main body while extending in a direction from the front end to the back end; and a first tapered part having a diameter smaller in a tapered manner from the front side toward the back side formed so as to connect the first main body and the second main body, wherein in the initial state where the male component is inserted into the female component, the first gaps are generated between: the elastic member covering the sides of the plurality of male spline parts on the first tapered part; and the elastic-member-facing sides of the plurality of female spline parts.

According to the construction of [4] above, the male component does not have a tapered form as a whole that is smaller in diameter in a tapered manner from the front side toward the back side, but has a tapered form only in part that connects the first main body and the second main body, and in addition, the second main body extends in a straight manner while having a substantially constant diameter from the front end toward the back end. Therefore, when the male component is rotated, the sides of the plurality of male spline parts press the sides of the plurality of female spline parts through the elastic member so that the resulting stress can be dispersed over the second main body extending in a straight manner. Accordingly, a stress concentrated on a part of the plurality of male or female spline parts (more specifically, the sides of the plurality of male or female spline parts) can be relaxed. Such a concentrated stress is generated by a pressure of the sides of the plurality of male spline parts on the sides of the plurality of female spline parts through the elastic member in a circumstance where the male component is tapered as a whole, for example, which would result in a decrease in the durability of the shaft structure. As a result, the construction of [4] above can improve the durability of the shaft structure in comparison with a conventional one.

[5] In the shaft structure or the male component as one aspect of [4] above, it is preferable that the male component further comprises a second tapered part having a diameter smaller in a tapered manner from the front side toward the back side formed further at the back end of the second main body, wherein in the initial state where the male component is inserted into the female component, the first gaps are generated between: the elastic member covering the sides of the plurality of male spline parts on the second tapered part; and the elastic-member-facing sides of the plurality of female spline parts. The concept of "tapered" here includes the concept of "chamfered."

According to the construction of [5] above, if either one of the male and female components arranged coaxially along a central axis deviates from the central axis due to a position gap, the elastic member on both of the first tapered part and the second tapered part abuts on the inner peripheral part of the female component, thereby enabling a concentrated stress to be further relaxed in comparison with the case of only the first tapered part.

[6] In the shaft structure as one aspect of [5] above, it is preferable that a pair of male components, as the male component, are arranged such that the female component in a cylindrical form is interposed between the pair of male components, and a part of one of the pair of male components is inserted into an inlet side of the female component while a part of the other of the pair of male components is inserted into an outlet side of the female component. The term "a part" here implies: the second tapered part; the second main body; and a portion positioned midway on the first tapered part.

According to the construction of [6] above, an embodiment that the cylindrically formed female component is interposed between the pair of male components, as an example of usage conditions of the shaft structure as a product, can also achieve similar effects to those achieved by the construction of [5] above.

[7] A shaft structure according to the present invention is characterized in that said shaft structure is installed in a shaft capable of making a power-transmission, and that said shaft structure comprises: a male component having a plurality of male spline parts and a plurality of male spline bottom parts formed on an outer peripheral part thereof; a female component having a plurality of female spline parts and a plurality of female spline bottom parts formed on an inner peripheral part thereof, the female component configured to allow the male component to be slidably inserted thereinto in an axial direction thereby making up said shaft structure; and an elastic member arranged on the female component such that a surface of the inner peripheral part of the female component is covered with the elastic member, wherein said shaft structure is configured such that in an initial state where the male component is inserted into the female component, the female and male components have second gaps generated between: sides of the plurality of male spline parts; and sides-facing portions of the elastic member, and when the male component is rotated with respect to the female component, a period of time, which elapses from the initial state to a state where the sides of the plurality of male spline parts and the portions of the elastic member abut on each other, has predetermined time differences along the axial direction.

[8] A female component according to the present invention is characterized in that said female component is installed in a shaft capable of making a power-transmission, and that said female component comprises: a plurality of female spline parts formed on an inner peripheral part thereof; a plurality of female spline bottom parts formed on an inner peripheral part thereof; and an elastic member arranged thereon such that a surface of inner peripheral parts of the plurality of female spline parts and the plurality of female spline bottom parts is covered with the elastic member, wherein said female component is configured to allow a male component to be inserted thereinto in an axial direction thereby making up a shaft structure, the male component having a plurality of male spline parts and a plurality of male spline bottom parts formed on an outer peripheral part thereof, and wherein said female component is further configured such that in an initial state where the male component is inserted into said female component, said female component and the male component have second gaps generated between: sides of the plurality of male spline parts; and sides-facing portions of the elastic member, and when the male component is rotated with respect to said female component, a period of time, which elapses from the initial state to a state where the sides of the plurality of male spline parts and the portions of the elastic member abut on each other, has predetermined time differences along the axial direction.

According to the construction of [7] or [8] above, when the male component is rotated with respect to the female component in the initial state where the male component is inserted into the female component, the sides of the plurality of male spline parts and the elastic member (more specifically, the sides of the plurality of female spline parts covered with the elastic member) abut on each other with predetermined time differences along the axial direction, thereby enabling the initial stiffness (the stiffness developed until the elastic member completes transformation, or the stiffness developed until the elastic member completes absorption of a pressure from the sides of the plurality of male spline parts) to increase gently. Consequently, the initial stiffness developed at a time when the male component is rotated can be further reduced, in comparison with a conventional one, so as to suppress a sudden transmission of a large power to the shaft, thereby capable of preventing the operator's abnormal feelings.

[9] In the shaft structure as one aspect of [7] above or the female component as one aspect of [8] above, it is preferable that the second gaps are generated such that a clearance between the sides of the plurality of male spline parts and the elastic member (more specifically, the sides of the plurality of female spline parts covered with the elastic member) is different along a direction in which the male component is inserted into the female component. More specifically, it is preferable that the second gaps are generated such that a clearance between the sides of the plurality of male spline parts and the sides-facing portions of the elastic member increases or decreases with increase in depth in an insertion direction.

According to the construction of [9] above, an elapsed period of time until the sides of the plurality of male spline parts abut on the elastic member (more specifically, the sides of the plurality of female spline parts covered with the elastic member) in the initial state where the male component is inserted into the female component can be made longer or shorter with increase in depth along the insertion direction of the male component. Accordingly, when the male component is rotated, the sides of the plurality of male spline parts press the sides of the plurality of female spline parts through the elastic member with predetermined time differences along the insertion direction, thereby capable of surely achieving the advantageous effects of increasing gently in the initial stiffness.

[10] In the shaft structure as one aspect of [9] above, it is preferable that the male component further comprises: a third main body formed at a front side to have a substantially constant diameter while extending in a direction from a front end to a back end; a fourth main body formed at a back side to have a substantially constant diameter smaller than a diameter of the third main body while extending in a direction from the front end to the back end; and a third tapered part having a diameter smaller in a tapered manner from the front side toward the back side formed so as to connect the third main body and the fourth main body, wherein in the initial state where the male component is inserted into the female component, the second gaps are generated between: the elastic-member-facing sides of the plurality of male spline parts on the third tapered part; and the elastic member covering the sides of the plurality of female spline parts.

According to the construction of [10] above, the shaft structure includes the third tapered part having a diameter smaller in a tapered manner from the front side toward the back side, and capable of connecting the third main body and the fourth main body, and in the initial state where the male component is inserted into the female component, the second gaps are generated, in the shaft structure, between: the elastic-member-facing sides of the plurality of male spline parts on the third tapered part; and the elastic member covering the sides of the plurality of female spline parts. In other words, the male component does not have a tapered form as a whole that is smaller in diameter in a tapered manner from the front side toward the back side, but has a tapered form only in part that connects the third main body and the fourth main body, and in addition, the fourth main body extends in a straight manner while having a substantially constant diameter from the front end toward the back end. Therefore, when the male component is rotated, the sides of the plurality of male spline parts press the sides of the plurality of female spline parts through the elastic member so that the resulting stress can be dispersed over the fourth main body extending in a straight manner. Accordingly, a stress concentrated on a part of the plurality of male or female spline parts (more specifically, the sides of the plurality of male or female spline parts) can be relaxed. Such a concentrated stress is generated by a pressure of the sides of the plurality of male spline parts on the sides of the plurality of female spline parts through the elastic member in a circumstance where the male component is tapered as a whole, for example, which would result in a decrease in the durability of the shaft structure. As a result, the construction of [4] above can improve the durability of the shaft structure in comparison with a conventional one.

[11] In the shaft structure as one aspect of [10] above, it is preferable that the male component further comprises a fourth tapered part having a diameter smaller in a tapered manner from the front side toward the back side formed further at the back end of the fourth main body, wherein in the initial state where the male component is inserted into the female component, the second gaps are generated between: the elastic-member-facing sides of the plurality of male spline parts on the fourth tapered part; and the elastic member covering the sides of the plurality of female spline parts. The concept of "tapered" here includes the concept of "chamfered."

According to the construction of [11] above, if either one of the male and female components arranged coaxially along a central axis deviates from the central axis due to a position gap, both of the third tapered part and the fourth tapered part abut on the elastic member on the inner peripheral part of the female component, thereby enabling a concentrated stress to be further relaxed in comparison with the case of only the third tapered part.

[12] In the shaft structure as one aspect of [11] above, it is preferable that a pair of male components, as the male component, are arranged such that the female component in a cylindrical form is interposed between the pair of male components, and a part of one of the pair of male components is inserted into an inlet side of the female component while a part of the other of the pair of male components is inserted into an outlet side of the female component. The term "a part" here implies: the fourth tapered part; the fourth main body; and a portion positioned midway on the third tapered part.

According to the construction of [12] above, an embodiment that the cylindrically formed female component is interposed between the pair of male components, as an example of usage conditions of the shaft structure as a product, can also achieve similar effects to those achieved by the construction of [11] above.

[13] In the shaft structure, the male component, or the female component as one aspect of [1] to [12] above, it is preferable that the elastic member is made of fabric impregnated with rubber or resin.

According to the construction of [13] above, when the male component is rotated in the initial state where the male component is inserted into the female component, a power is transmitted to the female component, which causes the elastic member to be transformed. If the elastic member is arranged on the outer peripheral part of the male component, for example, it rubs abrasively against the inner peripheral part of the female component, while if the elastic member is arranged on the inner peripheral part of the female component, for example, it rubs abrasively against the outer peripheral part of the male component. Furthermore, the abrasive rubbing is repeated every time the male component is rotated in right and left directions changed rather frequently than that in one direction. Under these conditions, an ordinary fabric without any treatment would soon wear away, which would raise a problem in torque transmission. By using a rubber- or resin-impregnated fabric as the elastic member for covering the outer peripheral part of the male component or the inner peripheral part of the female component, the present invention is capable of reducing the abrasion of the fabric impregnated with rubber or resin, and lengthening the life of the shaft structure.

BRIEF DESCRIPTION OF THE DRAWINGS

For more thorough understanding of the present invention and advantages thereof, the following descriptions should be read in conjunction with the accompanying drawings in which.

DESCRIPTION OF EMBODIMENTS OF THE INVENTION

First Embodiment

Hereinafter, a shaft structure (spline) as well as a male component (male spline shaft) and a female component (female spline shaft), both components making up the shaft structure, in a first embodiment of the present invention will be described with reference to FIGS. 1-6.

(Outlined Structure of Electric Power Steering Device)

Figure 1:
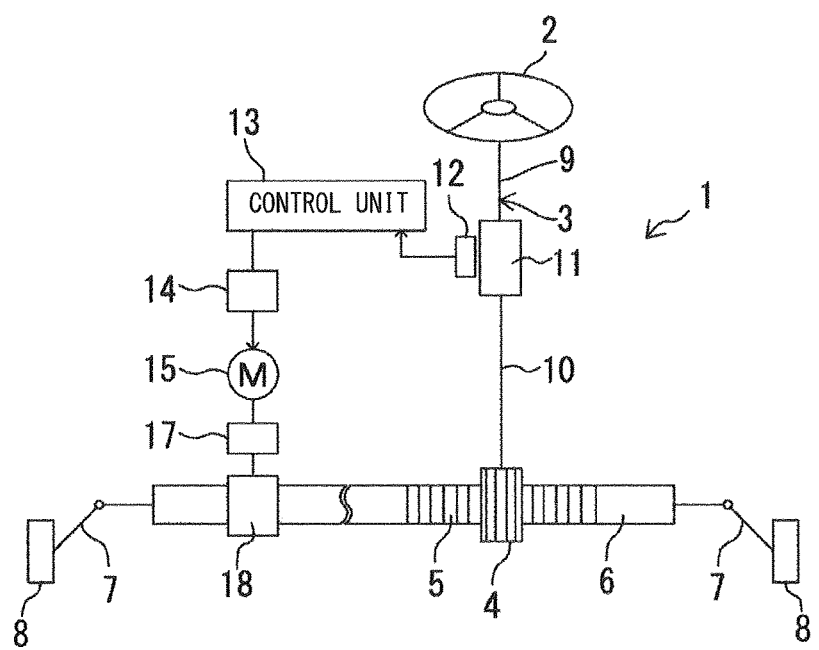
FIG. 1 depicts an example of schematic diagram of an electric power steering device applied with a shaft structure as a first embodiment of the present invention.

Explanations about the elements of an electric power steering device along with further explanations about the operation of such a device will be provided here. As shown in FIG. 1, the electric power steering device (EPS) (1) includes: a steering shaft (shaft) (3) connected to a steering wheel (2) as a steering component; and a rack shaft (6) having a pinion gear (4) disposed on an end of the steering shaft (3) and a rack gear (5) engaged with the pinion gear (4), where the rack shaft (6) can serve as a steering shaft extended in a lateral direction of the vehicle.

The rack shaft (6) has tie rods (7) connected to both ends thereof, respectively, and the tie rods (7) are connected to their respective wheels (8) through their respective knuckle arms (not shown). When the steering wheel (2) is manipulated so as to rotate the steering shaft (3), the rotational motion of the steering shaft (3) is converted by the pinion gear (4) and the rack gear (5) to the translational motion of the rack shaft (6) in a lateral direction of the vehicle. As a result, the steering of the wheels (8) can be thus achieved.

The steering shaft (3) is separated into an input shaft (9) connected to the steering wheel (2) and an output shaft (10) connected to the pinion gear (4). Such input/output shafts (9, 10) are coupled to each other via a torsion bar (11) along the same axis. Further, a torque sensor (12) is provided so as to detect steering torque on the basis of an amount of relative rotational displacement between the input and output shafts (9, 10) with respect to the torsion bar (11) interposed therebetween, and output torque-detection results obtained by the torque sensor (12) to a control unit (13). On the basis of: torque-detection results obtained by the torque sensor (12); vehicle-speed-detection results; and the like, the control unit (13) controls a driver (14) so as to adjust a voltage applied to an electric motor (15) for assistance in steering. Still further, the rotation of a rotary shaft (not shown) in the electric motor (15) is decreased in speed through a speed reducer (17). The outputted rotational motion of the speed reducer (17) is converted through a converter (18) to the translational motion of the rack shaft (6) in an axial direction, thereby resulting in assistance in steering. This electric power steering device (1) is that of the so-called rack assist type.

(Structure of Shaft Structure)

The shaft structure in an embodiment described above is applied e.g. to the steering shaft (3) described above (hereinafter, occasionally referred to as "shaft (3)" for short).

The shaft structure (20) according to the present invention is installed on a shaft (3) capable of making a power-transmission. The male and female components capable of making a power-transmission are configured such that the male component is slidably inserted into the female component in an axial direction, thereby making up such a shaft structure (20). The shaft structure (20), as shown in (a) of FIG. 2, includes a metallic male component (21), a metallic female component (22), and an elastic member (23) arranged such that a surface of an outer peripheral part (21b) of the male component (21) is covered with it.

Figure 3:
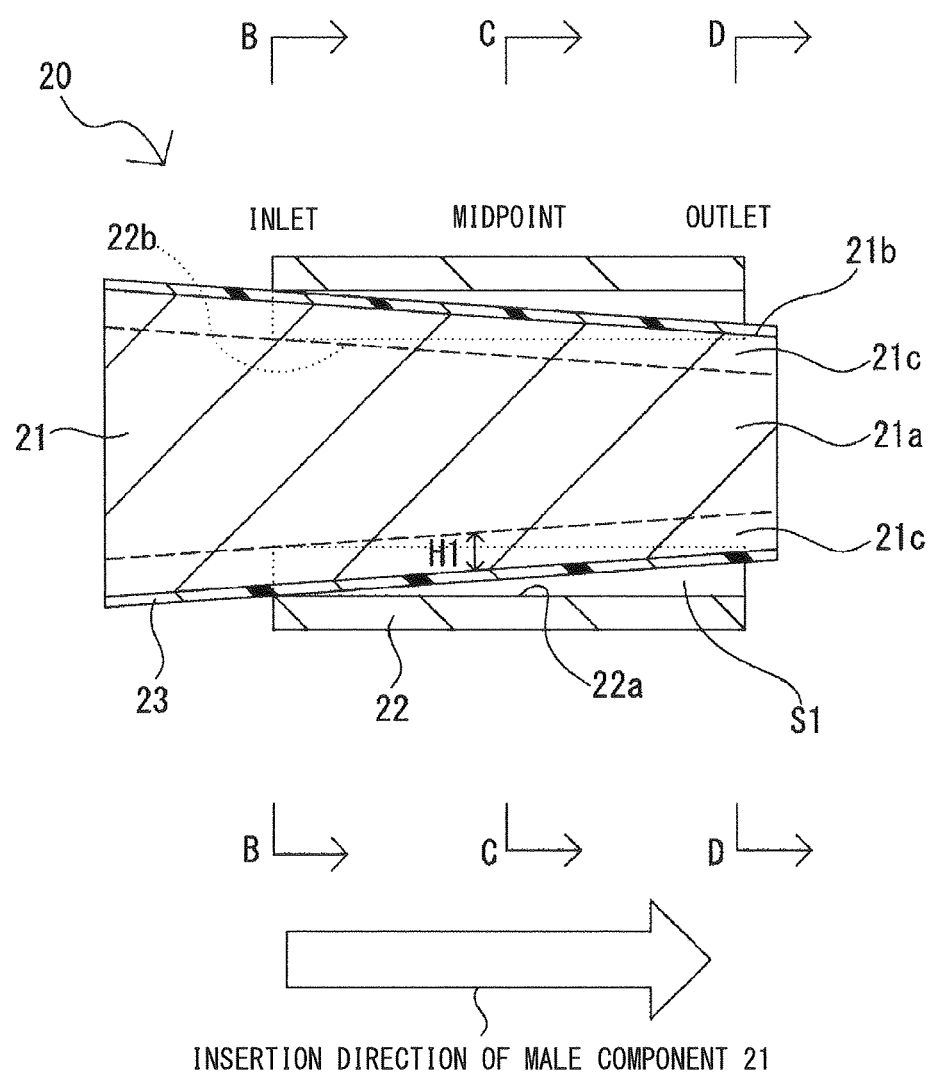
FIG. 3 depicts an enlarged section view taken along an arrowed line A-A of (b) shown in FIG. 2.
Figure 5:
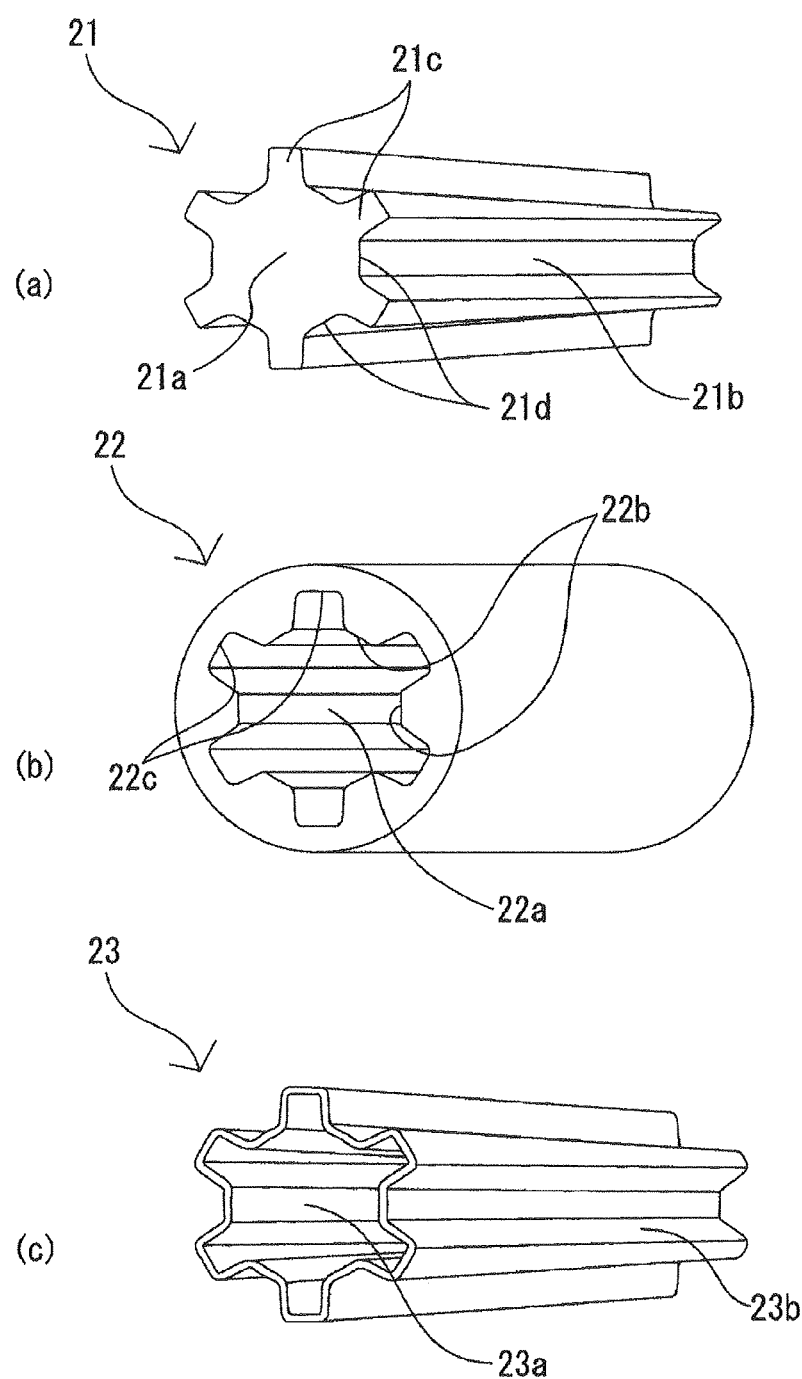
FIG. 5 depicts an exploded perspective view showing main parts of the shaft structure as the first embodiment of the present invention, which main parts include (a) an example of male component, (b) an example of female component, and (c) an example of elastic member to be arranged on an outer peripheral part of the male component.

The male component (21), as shown in (a) of FIG. 5, includes an axial core part (21a). As shown in FIG. 3, the axial core part (21a) has a tapered outer peripheral part (21b) narrowing along an insertion direction (a direction shown by a thick white arrow in FIG. 3) of the male component (21). As shown in (a) of FIG. 5, the outer peripheral part (21b) is formed with: e.g. six male spline parts (21c) arranged at predetermined intervals in a circumferential direction of the axial core part (21a); and e.g. six male spline bottom parts (21d) each arranged between a pair of the adjacent male spline parts (21c). As shown in FIG. 3, the male spline parts (21c) are substantially the same in height H1 as each other in a radial direction over an axial direction of the male component (21). The dashed lines in FIG. 3 indicate a boundary between the axial core part (21a) and the male spline parts (21c).

The female component (22), as shown in (b) of FIG. 5, is formed into a substantially cylindrical shape and has an inner peripheral part (22a) configured such that the male component (21) whose outer peripheral part (21b) is covered with an elastic member (23) (see (c) of FIG. 5) can be inserted into the inner peripheral part (22a). On the inner peripheral part (22a) of the female component (22), six female spline parts (22b) (the number of these spline parts is the same as that of the male spline parts (21 c) formed on the outer peripheral part (21b) of the male component (21), therefore six in this embodiment) are formed at predetermined intervals in a circumferential direction of the female component (22). The outline of the female spline parts (22b) is drawn with dotted lines and solid lines in FIG. 3. As shown in (b) of FIG. 5, on the inner peripheral part (22a) of the female component (22), six female spline bottom parts (22c) (the number of these spline bottom parts is the same as that of the male spline bottom parts (21d), therefore six in this embodiment) are formed between a pair of the adjacent female spline parts (22b).

Each of the female spline bottom parts (22c) is substantially U-shaped in cross section perpendicular to an axial direction.

The elastic member (23) can be made of rubber. As such types of rubber, the followings may be used in a neat form or in a form denatured in various ways: e.g., urethane rubber, nitrile rubber (NBR), silicon rubber, fluororubber, acrylic rubber, ethylene-propylene rubber, butyl rubber, isoprene rubber, chlorinated polyethylene rubber, epichlorohydrin rubber, hydrogenated nitrile rubber, chloroprene rubber, polybutadiene rubber, styrene-butadiene rubber, natural rubber, and the like. Each of these types of rubber may be used alone, or a plurality of types of rubber selected therefrom may be used in a blended form.

It is preferable that the elastic member (23) is made of fabric impregnated with rubber or resin. The fabric may be made of, e.g., aramid fiber, nylon, urethane, cotton, silk, linen, acetate, rayon, fluorine-containing fiber, polyester, and the like, which are impregnated with rubber or resin. The fabric may be made of e.g. short fibers or long fibers, and may also be a sheet-like fabric.

By virtue of impregnating fibers with rubber or resin, rubber material or resin material is enabled to fill the gaps among the fibers and bond the fibers together, thereby allowing the fibers to serve as a component (sheet body) like the elastic member (23). Further, by adopting fibers impregnated with rubber or resin as the elastic member (23), the wear caused by friction between the fibers can be reduced, and still further, the resistance to wear on the surface of the elastic member (23) caused by friction between the elastic member (23) and the female component (22) can be improved.

As rubber to be subjected to impregnation processing, the followings may be used in a neat form or in a form denatured in various ways: e.g., urethane rubber, nitrile rubber (NBR), silicon rubber, fluororubber, acrylic rubber, ethylene-propylene rubber, butyl rubber, isoprene rubber, chlorinated polyethylene rubber, epichlorohydrin rubber, hydrogenated nitrile rubber, chloroprene rubber, polybutadiene rubber, styrene-butadiene rubber, natural rubber, and the like. Each of these types of rubber may be used alone, or a plurality of types of rubber selected therefrom may be used in a blended form. Further, the rubber may contain appropriate amounts of traditional compounding ingredients for rubber, such as vulcanizing agent, vulcanizing accelerator, antioxidant, softener, plasticizer, filler, colorant, and the like as well as solid lubricants such as graphite, silicone oil, fluorine powder, molybdenum disulfide, or the like for enhancing the lubricity of the elastic member (23). Still further, the above types of rubber may be replaced by or combined with thermoplastic or thermosetting resin such as acrylic resin, polyester resin, urethane resin, vinyl chloride resin, polypropylene, polycarbonate, polyethylene terephthalate resin, fluorine resin, polyethylene, acrylonitrile-styrene resin, acrylonitrile-butadiene-styrene resin, polystyrene resin, polyvinyl chloride, polyvinylidene chloride, polyvinyl acetate, nylon, alkyd resin, phenolic resin, epoxy resin, polyphenylene sulfide resin, and the like.

When impregnating fibers with rubber or resin as described above, it is preferable that the rubber or resin be dissolved by a solvent or another means into a liquid state before dipping the predetermined fibers (short or long fibers) in the liquid. In practice, the sheet-like fabric made of the fibers may be used. This fabric is impregnated with rubber or resin in the same way as described above.

The fabric may be, e.g., non-woven fabric made of irregularly tangled fibers, regularly-formed woven, knitted fabric, and the like. These fabrics are characterized by facilitating impregnation (easier handling) with rubber and the like, and further facilitating adhesion to the surface of the shaft structure described below in comparison with those made of fibers (short or long fibers) only, because these fabrics are in sheet form. The woven fabric may be made in a plain weave, satin weave, twill weave, or the like.

The fabric may preferably be stretchy to some extent. By virtue of such stretchiness, when the fabric is formed so as to be in line with the male spline parts (21c) and male spline bottom parts (21d) in shape, or when the fabric is adhered to a surface of the outer peripheral part (21b) of the male component (21), there can be achieved the advantageous effects that a surface of the stretchy fabric can easily be shaped in accordance with any concave-convex formed surfaces, and the resultant elastic member (23) has the surface subjected to few creases and uniformly finished.

Figure 6:
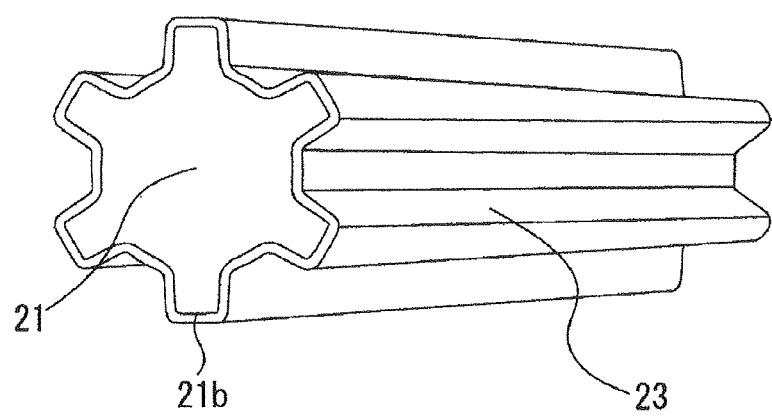
FIG. 6 depicts a perspective view of the male component, as the first embodiment of the present invention, having an elastic member adhered to the outer peripheral part of the male component with glue.

As shown in (c) of FIG. 5, the elastic member (23) has an inner peripheral part (23a) substantially the same in shape as the outer peripheral part (21b) of the male component (21) (see (a) of FIG. 5), and an outer peripheral part (23b) capable of being inserted into the inner peripheral part (22a) of the female component (22) (see (b) of FIG. 5). In this embodiment, as shown in FIG. 6, the elastic member (23) is adhered to the outer peripheral part (21b) of the male component (21). The adhesive used here may be, e.g., acrylic resin adhesive, olefin adhesive, urethane resin adhesive, ethylene-vinyl acetate resin adhesive, epoxy resin adhesive, vinyl chloride resin adhesive, chloroprene rubber adhesive, cyanoacrylate adhesive, silicon adhesive, styrene-butadiene rubber adhesive, nitrile rubber adhesive, hot-melt adhesive, phenolic resin adhesive, melamine resin adhesive, urea resin adhesive, resorcinol adhesive, and the like. There are methods to cure an adhesive for bonding: by heating an adhesive so as to cause the adhesive to melt as fluid, applying the melting adhesive, and thereafter cooling the applied adhesive; just by heating an adhesive; or the like.

Figure 2:
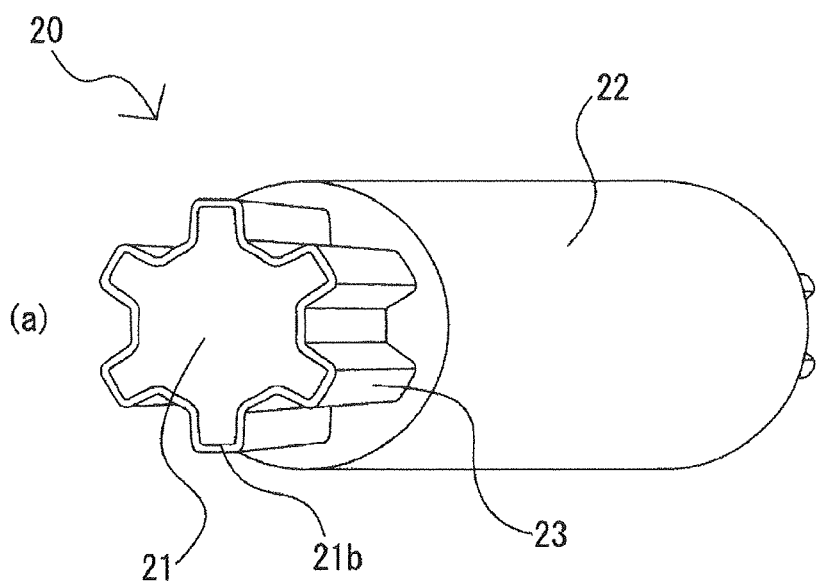
FIG. 2 depicts (a) an example of perspective view of the shaft structure as the first embodiment of the present invention, and (b) a front view of the shaft structure of (a).
Figure 2:
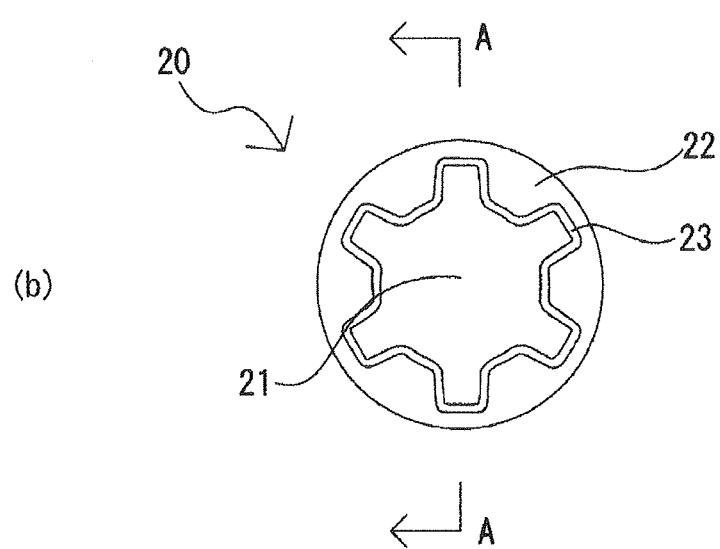

FIG. 3 depicts an enlarged section view taken along an arrowed line A-A of (b) shown in FIG. 2, which is indicative of the initial state where the male component (21) is inserted into the female component (22). As shown in FIG. 3, the shaft structure (20) in this embodiment, in the initial state where the male component (21) is inserted into the female component (22), has first gaps S1. The first gaps S1 (blank parts in FIG. 3) defined by the inner peripheral part (22a) of the female component (22) and the elastic member (23) extend over an entire length of the female component (22) in an axial direction as shown in FIG. 3. As will be described later in detail, the first gaps S1 are formed such that a clearance between the sides (22d) of the female spline parts (22b) and the elastic member (23) changes along an insertion direction (a direction shown by a thick white arrow in FIG. 3) of the male component (21).

Figure 4:
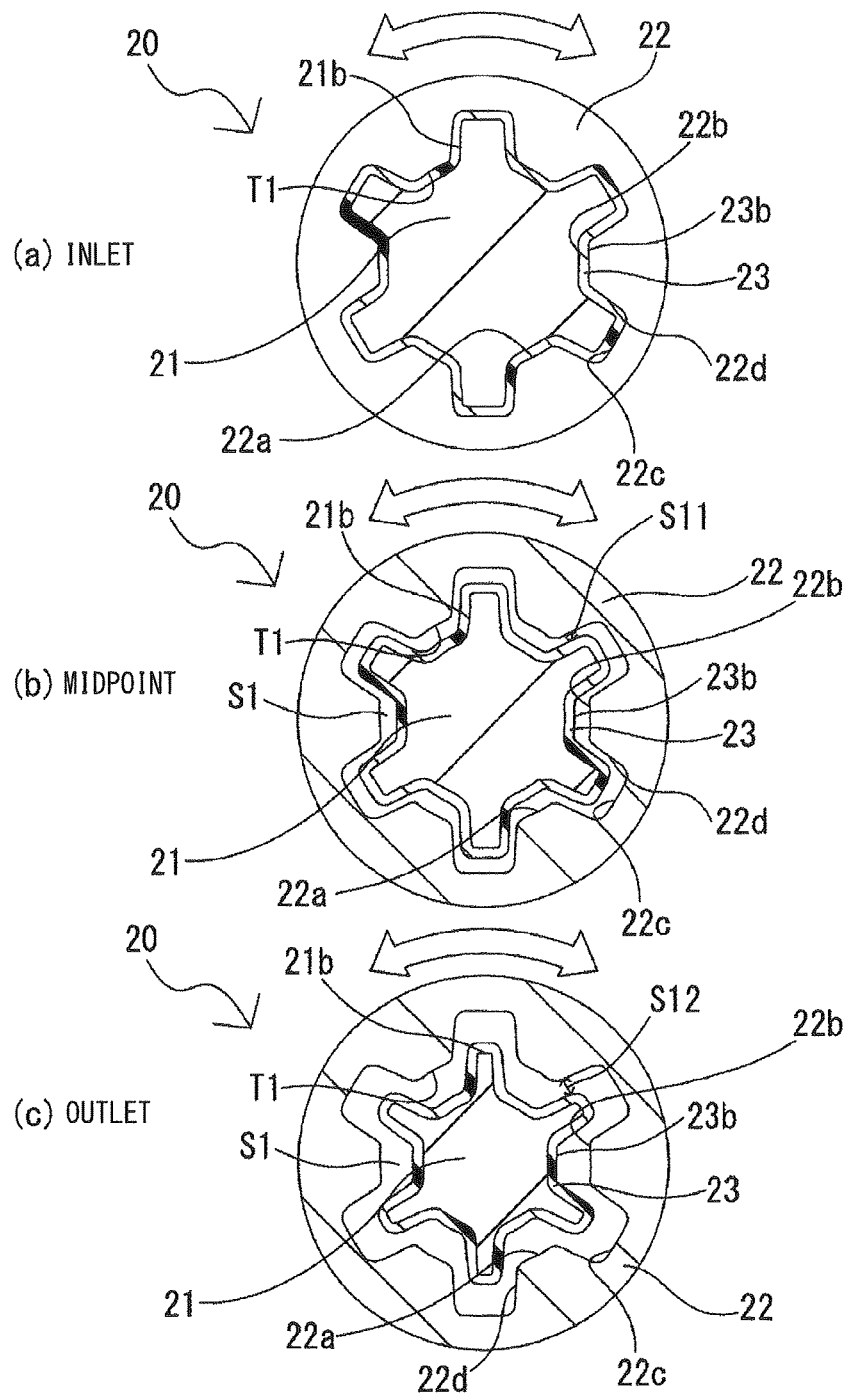
FIG. 4 depicts (a) a section view taken along an arrowed line B-B shown in FIG. 3, (b) a section view taken along an arrowed line C-C shown in FIG. 3, and (c) a section view taken along an arrowed line D-D shown in FIG. 3.

FIG. 4 depicts (a) a section view taken along an arrowed line B-B shown in FIG. 3, and shows a section view of only the male component (21) and the elastic member (23). As shown in (a) of FIG. 4, in the initial state where the male component (21) is inserted into the female component (22), an entire surface of the inner peripheral part (22a) (the female spline parts (22b) and female spline bottom parts (22c)) of the female component (22) abuts on the outer peripheral part (23b) of the elastic member (23), which faces the inner peripheral part (22a), substantially without any gaps at an inlet of the female component (22) to be inserted with the male component (21). The elastic member (23) is configured such that the elastic member (23) subjected to transformation caused by rotation of the male component (21) can escape toward a deeper side in an insertion direction (toward an outlet side of the female component (22)) of the male component (21).

It is preferable that the sides (22d) of the female spline parts (22b) abut on the elastic member (23) substantially without any gaps at an inlet (see (a) of FIG. 4), but it is not necessarily required that the entire surface of the inner peripheral part (22a) of the female component (22) abut on the elastic member (23). For example, as shown in a shaft structure (420) in (a) of FIG. 25 as a modified example of this embodiment, gaps S5 may be generated between tops T5 of female spline parts (422b) and an outer peripheral part (423b) of an elastic member (423).

Figure 25:
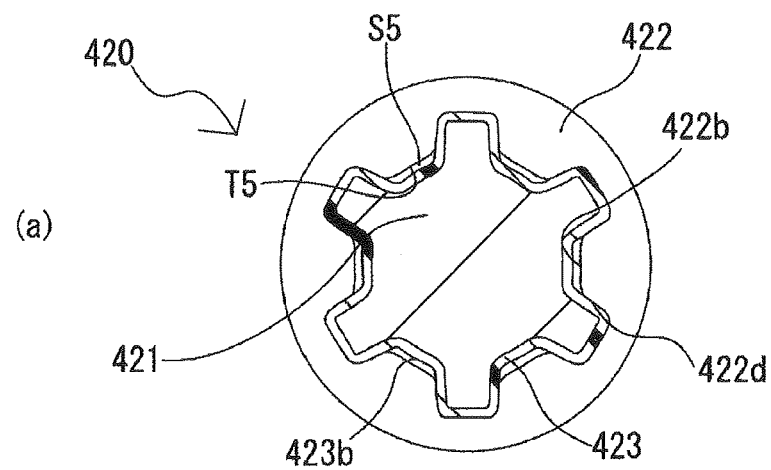
FIG. 25 depicts (a) a view showing a modified example of the shaft structure as the first embodiment of the present invention, and (b) a view showing another modified example of the shaft structure as the first embodiment of the present invention.
Figure 25:
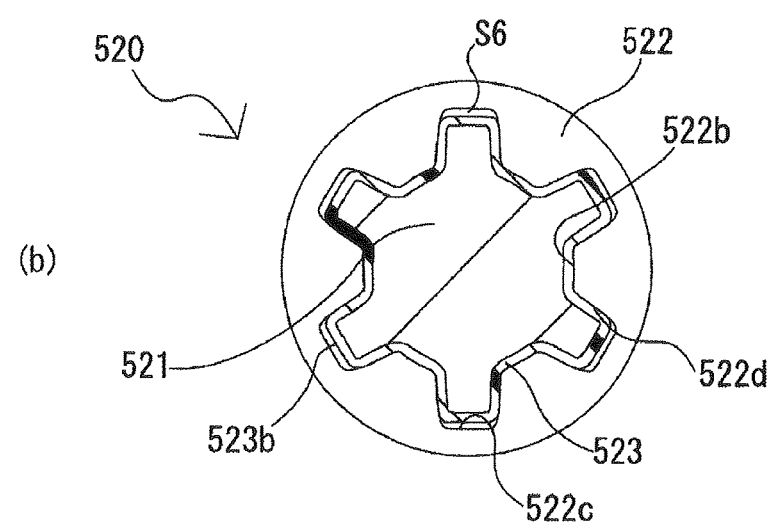

Further, as shown in a shaft structure (520) in (b) of FIG. 25 as another modified example of this embodiment, gaps S6 may be generated between female spline bottom parts (522c) and an outer peripheral part (523b) of the elastic member (523). Still further, the gaps may be generated between the female spline bottom parts and the outer peripheral part of the elastic member facing the female spline bottom parts in a further modified example in (a) of FIG. 25 such as S6 shown in (b) of FIG. 25. Still further, the gaps may be generated between the tops of the female spline parts and the outer peripheral part of the elastic member facing the tops of the female spline parts in a further modified example in (b) of FIG. 25 such as S5 shown in (a) of FIG. 25.

FIG. 4 depicts (b) a section view taken along an arrowed line C-C shown in FIG. 3. As shown in (b) of FIG. 4, in the initial state where the male component (21) is inserted into the female component (22), first gaps S11 are generated, in a circumferential direction at a midpoint of the female component (22), between the sides (22d) of the female spline parts (22b) and the outer peripheral part (23b) of the elastic member (23) facing the sides (22d) of the female spline parts (22b).

FIG. 4 depicts (c) a section view taken along an arrowed line D-D shown in FIG. 3. As shown in (c) of FIG. 4, in the initial state where the male component (21) is inserted into the female component (22), first gaps S12 larger than the first gaps S11 (see (b) of FIG. 4) are generated, in a circumferential direction at an outlet of the female component (22), between the sides (22d) of the female spline parts (22b) and the outer peripheral part (23b) of the elastic member (23) facing the sides (22d) of the female spline parts (22b).

As shown in (a) to (c) of FIG. 4, in the initial state where the male component (21) is inserted into the female component (22), first gaps S1 (S11, S12) generated between the sides (22d) of the female spline parts (22b) and the outer peripheral parts (23b) of the elastic member (23) increases in size along an insertion direction (toward an outlet side of the female component (22)) of the male component (21). By virtue of such a configuration, when the male component (21) is rotated with respect to the female component (22) in a circumferential direction (each direction shown by a thick white arrow in (a) to (c) of FIG. 4) from the initial state shown in (a) to (c) of FIG. 4, an elapsed period of time until the sides (22d) of the female spline parts (22b) abut on the sides of the male spline parts (21c) covered with the elastic member (23) can be made longer with increase in depth along an insertion direction (toward an outlet side of the female component (22)) of the male component (21).

(Press Motion in Embodiment)

When the male component (21) is rotated in a circumferential direction (each direction shown by a thick white arrow in (a) to (c) of FIG. 4) from the initial state shown in (a) to (c) of FIG. 4, an initial stiffness starts being developed at an inlet (see (a) of FIG. 4), and the sides of the male spline parts (21c) on the outer peripheral part (21b) of the male component (21) are caused to press the sides (22d) of the female spline parts (22b) through the elastic member (23). When the male component (21) is rotated by a predetermined angle, the elastic member (23) abuts on a part of the sides (22d) of the female spline parts (22b), after the above state at an inlet (see (a) of FIG. 4), with respect to a portion from an inlet (see (a) FIG. 4) toward a midpoint (see (b) of FIG. 4) in a continuous manner, which results in a gradual increase in contact area between the elastic member (23) and the sides (22d) of the female spline parts (22b).

Subsequently, when the male component (21) is rotated further by a predetermined angle, the elastic member (23) abuts further on a part of the sides (22d) of the female spline parts (22b), after the above state at a midpoint (see (b) of FIG. 4), with respect to a portion from a midpoint (see (b) of FIG. 4) toward an outlet (see (c) of FIG. 4) in a continuous manner, which results in a gradual increase in contact area between the elastic member (23) and the sides (22d) of the female spline parts (22b).

Still subsequently, at an outlet (see (c) of FIG. 4), the outer peripheral part (21b) of the male component (21) is caused to press the sides (22d) of the female spline parts (22b), through the elastic member (23), with respect to a portion in the vicinity of tops Ti out of an entire portion of the sides (22d) of the female spline parts (22b), until the elastic member (23) completes transformation. When the elastic member (23) completes transformation at an outlet, an initial stiffness changes into a secondary stiffness, and a pressure from the outer peripheral part (21b) of the male component (21) starts being transmitted directly to the inner peripheral part (22a) of the female component (22).

By virtue of the above mechanism where the elastic member (23) and the sides (22d) of the female spline parts (22b) abut on each other with time differences i.e. increase gradually in contact area therebetween with respect to a portion from an inlet (see (a) of FIG. 4) toward an outlet (see (c) of FIG. 4) when the male component (21) is rotated, an initial stiffness developed when the male component (21) is rotated increases gently so that the female component (22) can be rotated smoothly in a circumferential direction (each direction shown by a thick white arrow in (a) to (c) of FIG. 4). Subsequently, the elastic member (23) completes transformation at an outlet, and the outer peripheral part (21b) of the male component (21) starts transmitting pressure directly to the inner peripheral part (22a) of the female component (22), and therefore, an operator can rotate the female component (22) by a desired angle in conjunction with the male component (21) so that a pinion gear (4) (see FIG. 1) can be rotated by a desired angle.

For the realization of such a mechanism, it is preferable that when the male component (21) is rotated in a state where it is inserted into the female component (22), a shifting range of the male component (21) in an axial direction is limited within a predetermined range such that a relative position gap of the male component (21) with respect to the female component (22) is not generated. It is further preferable that the male component (21) does not pull out of the female component (22).

The shaft structure (20) can be manufactured by sequentially performing the steps of e.g.: cutting the male and female components (21, 22) having their respective shapes as shown in (a), (b) of FIG. 5 from metal material (not shown); and arranging the elastic member (23) on the outer peripheral part (21b) of the male component (21).

Further, regarding a method of manufacturing the elastic member (23), the following may be appropriately selected. In order to form the elastic member (23) shown in e.g. (c) of FIG. 5, inner and outer molds for forming the inner and outer peripheral parts (23a, 23b), respectively, are prepared. It is a matter of course that the outer surface of the inner mold and the inner surface of the outer mold have a concave-convex form corresponding to the inner and outer peripheral parts (23a, 23b), respectively. Fibers (short fibers or long fibers) impregnated with rubber or resin are stuffed between the inner and outer molds, and thereafter the stuffed fibers are pressed and heated through the molds. Subsequently, the fibers are removed from between the molds. Still subsequently, elastic member (23) having inner and outer peripheral parts (23a, 23b) molded can be obtained.

Still further, regarding an alternative method of manufacturing the elastic member (23), it may also be formed by: initially making fabric supposed to fill a gap between an inner mold and an outer mold into a cylindrical shape in accordance with an outer shape of the inner mold; subsequently disposing the cylindrically-shaped fabric on the inner mold in accordance with the outer shape of the inner mold; and thereafter pressing and heating the fabric placed on the inner mold in a similar manner to the above. In this case, the stretchiness of the fabric enables the elastic member (23) to be formed further in accordance with the concave-convex form of the inner and outer molds. As a result, the formed elastic member (23) having the inner or outer peripheral parts (23a, 23b) subjected to no creases and uniformly finished can be manufactured. By forming the fabric into a cylindrical shape in such a manner that a stretchiness direction of the fabric to be formed is aligned at least with a circumferential direction of the formed elastic member (23) in a cylindrical shape, the occurrence of creases can be further reduced.

The male component (21) having the outer peripheral part (21b) adhered with the impregnation-processed elastic member (23) as shown in FIG. 6 can be manufactured by performing the following steps, on condition that "the inner mold" in the above-described manufacturing method is replaced with "the male component (21)": the step of applying adhesive on a metal surface of the male component (21); the step of subsequently filling fibers (short fibers, or long fibers, or a sheet-like fabric) impregnated with rubber or resin between the male component (21) and the outer mold; the step of still subsequently pressing and heating the fibers through the outer mold; and thereafter the step of removing the outer mold, thereby obtaining the male component (21) having the outer peripheral part (21b) adhered with the elastic member (23) as shown in FIG. 6. In a similar manner to the above, as an alternative method, the component shown in FIG. 6 may be obtained by: initially making fabric into a cylindrical shape in accordance with an outer shape of the male component (21); subsequently disposing the cylindrically-shaped fabric on the male component (21) in accordance with the outer shape thereof; and thereafter pressing the fabric placed on the male component (21). According to such a method, by virtue of the stretchiness of the fabric, the surface of the elastic member (23) adhered to the outer peripheral part (21b) of the male component (21) is resistant to the generation of creases, and is uniformly finished. By forming the elastic member (23) into a cylindrical shape in such a manner that a stretchiness direction of the fabric to be formed is aligned at least with a circumferential direction of the male component (21), the occurrence of creases can be further reduced as described above.

(Features of Shaft Structure of First Embodiment)

In the construction above, when the male component (21) is rotated in the initial state where it is inserted into the female component (22), the sides (22d) of the female spline parts (22b) and the elastic member (23) abut on each other with a predetermined time difference between: a position where gaps between the sides (22d) of the female spline parts (22b) and the elastic member (23) (first gaps S1 in a circumferential direction) are large (at an outlet in this embodiment, see (c) of FIG. 4); and a position where the gaps are small (at e.g. a midpoint in this embodiment, see (b) of FIG. 4). Accordingly, an initial stiffness (a stiffness developed until the elastic member (23) completes transformation, or a stiffness developed until the elastic member (23) completes absorption of a pressure from the male component (21)), when the male component (21) is rotated, is allowed to increase gently. Consequently, an initial stiffness when the male component (21) is rotated can be further reduced, in comparison with a conventional one, so as to suppress a sudden transmission of a large power to the shaft (3), thereby capable of preventing the operator's abnormal feelings of reduced control (abnormal feelings suffered from by the operator when the force required for the operator to handle the steering wheel (2) decreases drastically immediately after the operator starts handling the steering wheel (2)).

Further, in the construction above, the outer peripheral part (21b) of the male component (21) has a tapered form narrowing along an insertion direction of the male component (21), and therefore, first gaps S1 can easily be formed such that a clearance between the sides (22d) of the female spline parts (22b) and the outer peripheral part (23b) of the elastic member (23) increases with increase in depth in an insertion direction of the male component (21). As a result, an elapsed period of time until the sides (22d) of the female spline parts (22b) abut on the elastic member (23) when the male component (21) is rotated can be made longer with increase in depth along an insertion direction of the male component (21) (toward an outlet side of the female component (22)). Consequently, when the male component (21) is rotated, the sides of the male spline parts (21c) are caused to press the sides (22d) of the female spline parts (22b) through the elastic member (23), with predetermined time differences, along a direction from a front side (an inlet side)

to a back side (an outlet side), which results in surely achieving the advantageous effects of a gentle increase in stiffness from an initial stiffness when the male component (21) is rotated.

When the male component (21) is rotated in a state where it is inserted into the female component (22), a power of the rotation is transmitted to the female component (22) so as to transform the elastic member (23). During this movement, the elastic member (23) rubs abrasively against the inner peripheral part (22a) of the female component (22). Furthermore, such abrasive rubbing between the elastic member (23) and the inner peripheral part (22a) of the female component (22) occurs in a repetitive manner, every time the male component (21) is rotated to the right and left, and further, in a frequently changed direction. Under these conditions, if fabric covering the surface of the outer peripheral part (21b) of the male component (21) is an ordinary fabric without any treatment, it would soon wear away, which would raise a problem in torque transmission. In the first embodiment, when a rubber- or resin-impregnated fabric is used as the elastic member (23), by virtue of covering the outer peripheral part (21b) of the male component (21) with the fabric, the abrasion of the elastic member (23) can be reduced, and the life of the shaft structure (20) can be lengthened.

Further, the shaft structure in the construction above has a degree of vertical and horizontal freedom, at a midpoint and at an outlet, relative to an insertion direction of the male component (21) based on an inlet as a supporting point as shown in FIG. 3, thereby capable of achieving the auxiliary advantageous effects of easy installation of a worm gear or the like.

Still further, the male component (21) and the female component (22) are configured such that gaps between the sides (22d) of the female spline parts (22b) and the outer peripheral part (23b) of the elastic member (23) increase with increase in depth along an insertion direction of the male component (21); however, the sides (22d) of the female spline parts (22b) and the elastic member (23) abut on each other substantially without any gaps at some point (in the vicinity of an inlet, in this case) in an axial direction, thereby capable of suppressing wobbling to be generated between the male component (21) and the female component (22).

Second Embodiment

Next, hereinafter, a shaft structure (spline) as well as a male component (male spline shaft) and a female component (female spline shaft), both components making up the shaft structure, in a second embodiment of the present invention will be described with reference to FIGS. 7-12. Note that detailed descriptions of the parts (101) to (115), (117), and (118) in the second embodiment will be omitted because they are the same as the above-described parts (1) to (15), (17), and (18) in the first embodiment, respectively.

(Outlined Structure of Electric Power Steering Device)

Figure 7:
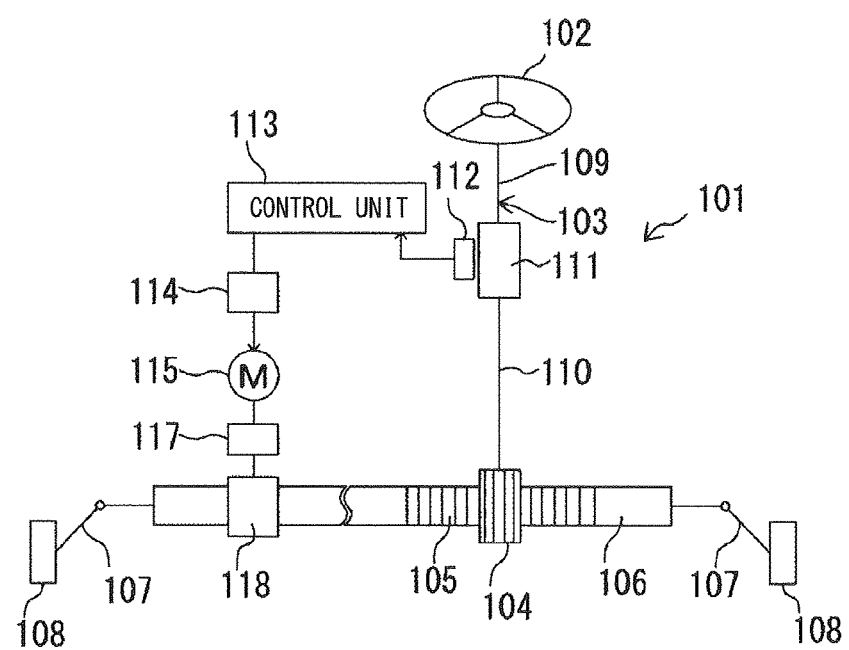
FIG. 7 depicts an example of schematic diagram showing an electric power steering device applied with a shaft structure as a second embodiment of the present invention.

As shown in FIG. 7, the electric power steering device (EPS) (101) includes: a steering shaft (shaft) (103) connected to a steering wheel (102) as a steering component; and a rack shaft (106) having a pinion gear (104) disposed on an end of the steering shaft (103) and a rack gear (105) engaged with the pinion gear (104), where the rack shaft (106) can serve as a steering shaft extended in a lateral direction of the vehicle.

(Structure of Shaft Structure)

The shaft structure in an embodiment described above is applied e.g. to the steering shaft (103) described above (hereinafter, occasionally referred to as "shaft (103)" for short).

The shaft structure (120) according to the present invention is installed on a shaft (103) capable of making a power-transmission. The male and female components capable of making a power-transmission are configured such that the male component is slidably inserted into the female component in an axial direction, thereby making up such a shaft structure (120). The shaft structure (120), as shown in (a) of FIG. 8, includes a metallic male component (121), a metallic female component (122), and an elastic member (123) arranged such that a surface of an inner peripheral part (122a) of the female component (122) is covered with it.

Figure 9:
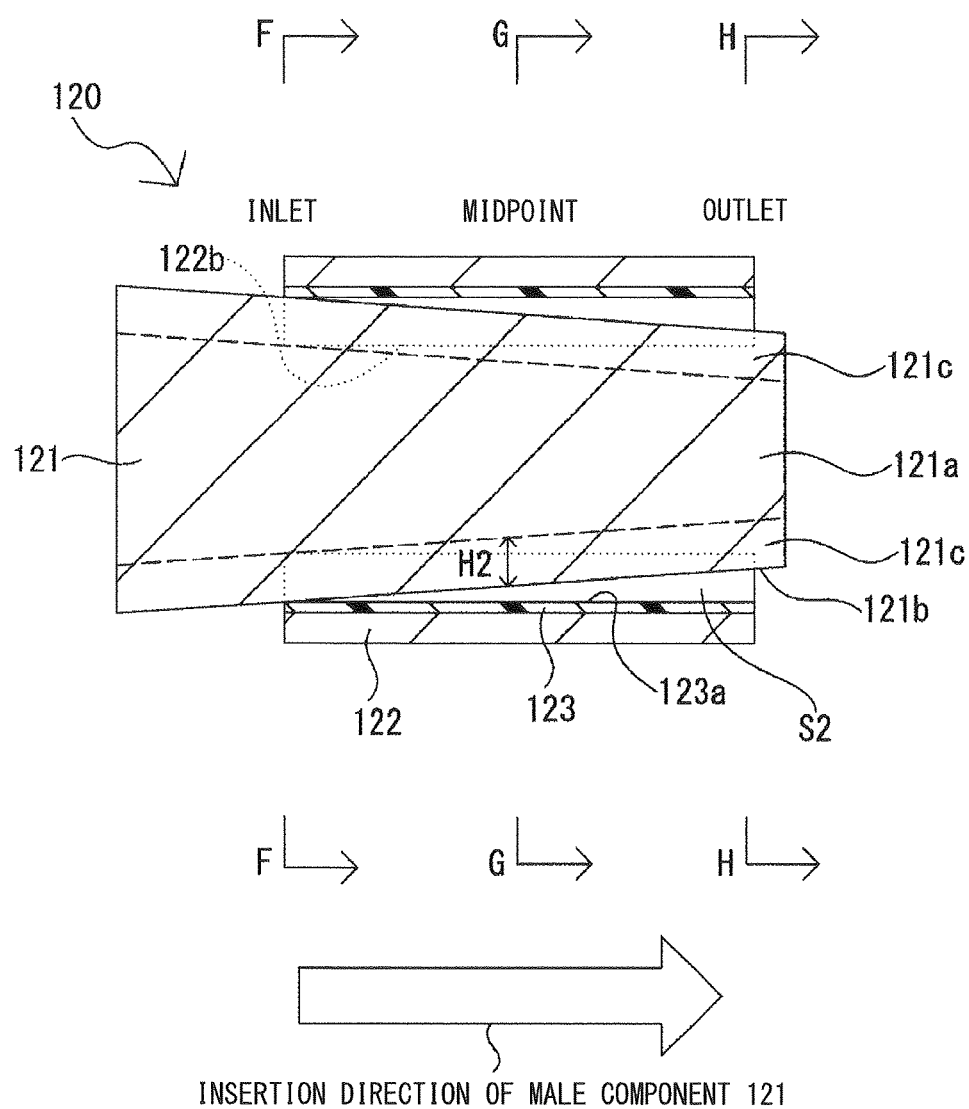
FIG. 9 depicts an enlarged section view taken along an arrowed line E-E of (b) shown in FIG. 8.
Figure 11:
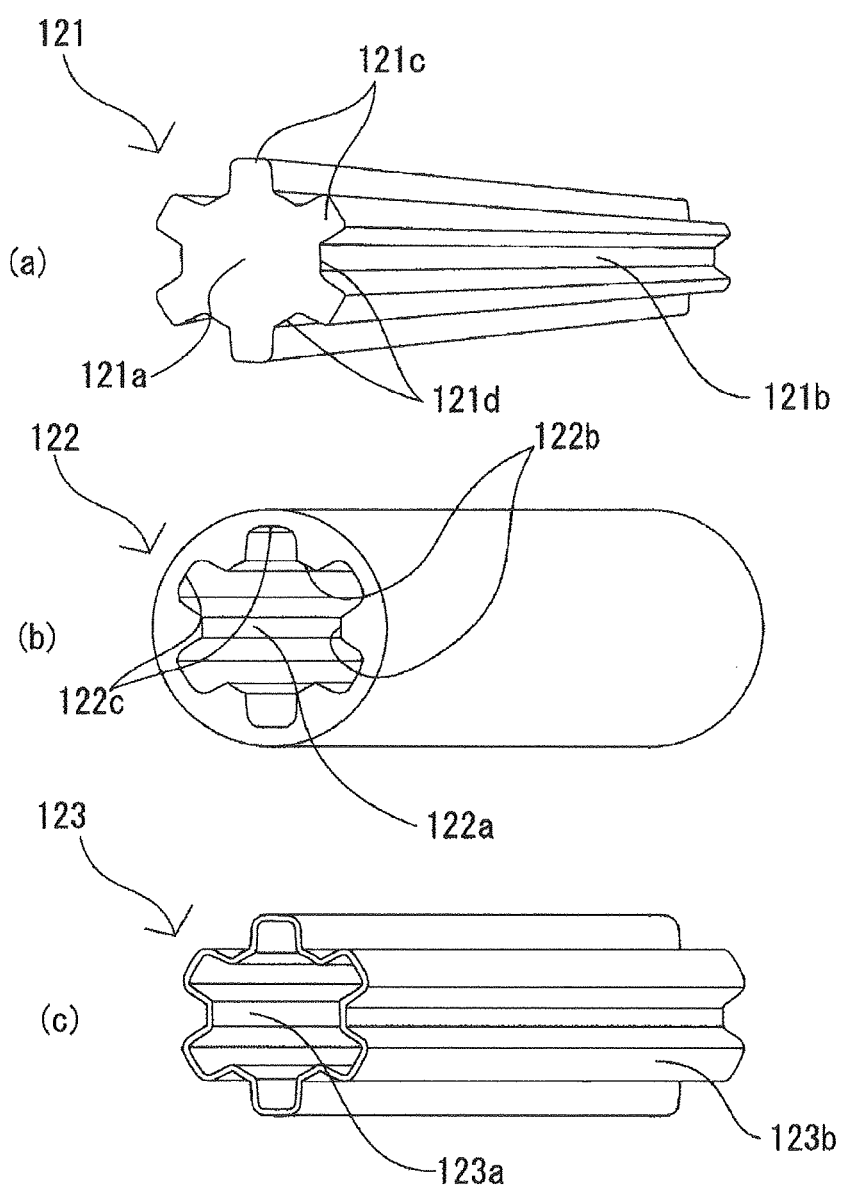
FIG. 11 depicts an exploded perspective view showing main parts of the shaft structure as the second embodiment of the present invention, which main parts include (a) an example of male component, (b) an example of female component, and (c) an example of elastic member to be arranged on an inner peripheral part of the female component.

The male component (121), as shown in (a) of FIG. 11, includes an axial core part (121a). As shown in FIG. 9, the axial core part (121a) has a tapered outer peripheral part (121b) narrowing along an insertion direction (a direction shown by a thick white arrow in FIG. 9) of the male component (121). As shown in (a) of FIG. 9, the outer peripheral part (121b) is formed with: e.g. six male spline parts (121c) arranged at predetermined intervals in a circumferential direction of the axial core part (121a); and e.g. six male spline bottom parts (121d) each arranged between a pair of the adjacent male spline parts (121c). As shown in FIG. 9, the male spline parts (121c) are substantially the same in height H2 as each other in a radial direction over an axial direction of the male component (121). The dashed lines in FIG. 9 indicate a boundary between the axial core part (121a) and the male spline parts (121c).

The female component (122), as shown in (b) of FIG. 11, is formed into a substantially cylindrical shape and has an inner peripheral part (122a) configured such that the male component (121) can be inserted into the inner peripheral part (122a). On the inner peripheral part (122a) of the female component (122), six female spline parts (122b) (the number of these spline parts is the same as that of the male spline parts (121c) formed on the outer peripheral part (121b) of the male component (121), therefore six in this embodiment) are formed at predetermined intervals in a circumferential direction of the female component (122). The outline of the female spline parts (122b) is drawn with dotted lines and solid lines in FIG. 9. As shown in (b) of FIG. 11, on the inner peripheral part (122a) of the female component (122), six female spline bottom parts (122c) (the number of these spline bottom parts is the same as that of the male spline bottom parts (121d), therefore six in this embodiment) are formed between a pair of the adjacent female spline parts (122b). Each of the female spline bottom parts (122c) is substantially U-shaped in cross section perpendicular to an axial direction.

The elastic member (123) can be made of material similar to that used for the elastic member (123) in the first embodiment. Further, the elastic member (123) can be made of fabric impregnated with rubber or resin in a similar manner for the elastic member (123) in the first embodiment.

Figure 12:
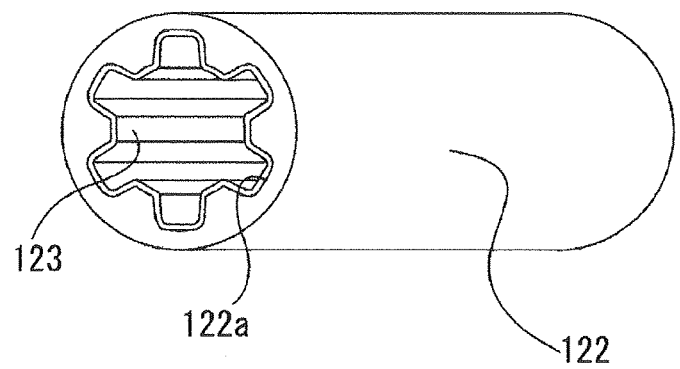
FIG. 12 depicts a perspective view of the female component, as the second embodiment of the present invention, having an elastic member adhered to the inner peripheral part of the female component with glue.

As shown in (c) of FIG. 11, the elastic member (123) has an inner peripheral part (123a) capable of being inserted with the outer peripheral part (121b) of the male component (121) (see (a) of FIG. 11), and an outer peripheral part (123b) substantially the same in shape as the inner peripheral part (122a) of the female component (122) (see (b) of FIG. 11). In this embodiment, as shown in FIG. 12, the elastic member (123) is adhered to the inner peripheral part (122a) of the female component (122). The adhesive used here may be the same as those used in the first embodiment.

Figure 8:
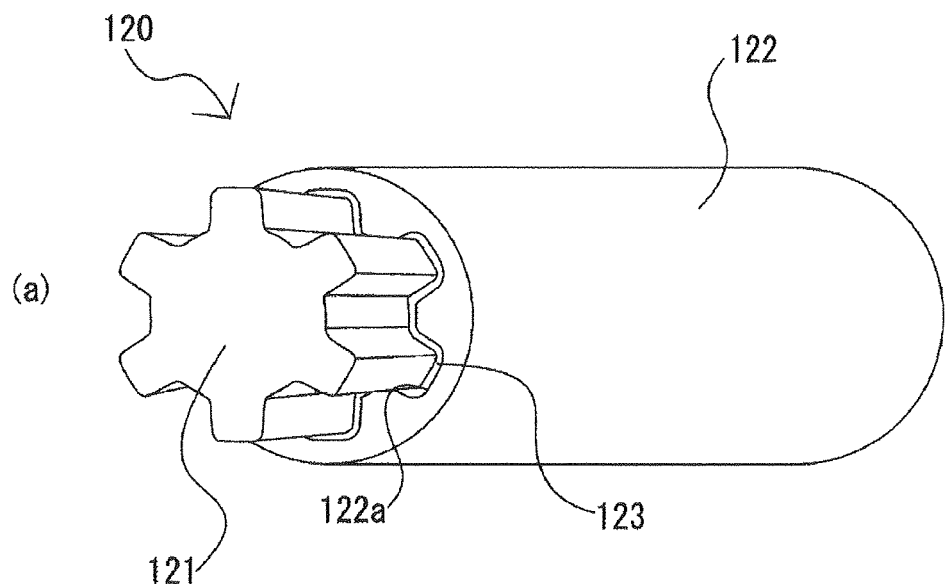
FIG. 8 depicts (a) an example of perspective view of the shaft structure as the second embodiment of the present invention, and (b) a front view of the shaft structure of (a).
Figure 8:
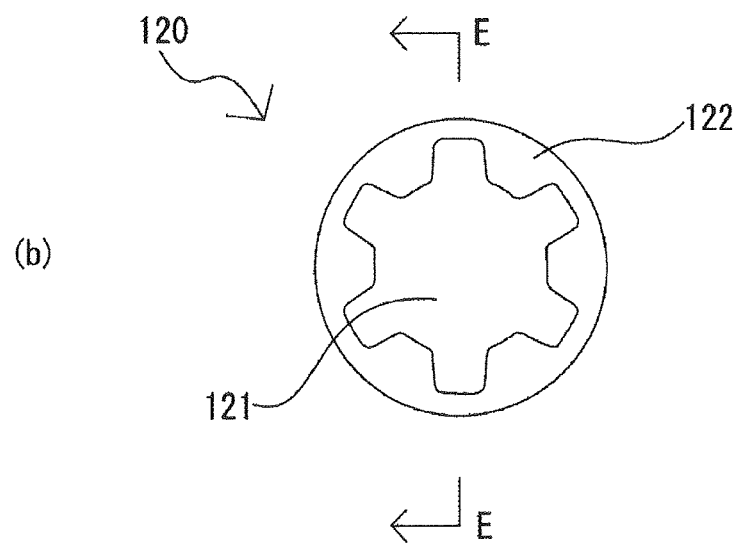

FIG. 9 depicts an enlarged section view taken along an arrowed line E-E of (b) shown in FIG. 8, which is indicative of the initial state where the male component (121) is inserted into the female component (122). As shown in FIG. 9, the shaft structure (120) in this embodiment, in the initial state where the male component (121) is inserted into the female component (122), has second gaps S2. The second gaps S2 (blank parts in FIG. 9) defined by the outer peripheral part (121b) of the male component (121) and the elastic member (123) extend over an entire length of the female component (122) in an axial direction as shown in FIG. 9. As will be described later in detail, the second gaps S2 are formed such that a clearance between the sides (121e) of the male spline parts (121c) and the elastic member (123) changes along an insertion direction (a direction shown by a thick white arrow in FIG. 9) of the male component (121).

Figure 10:
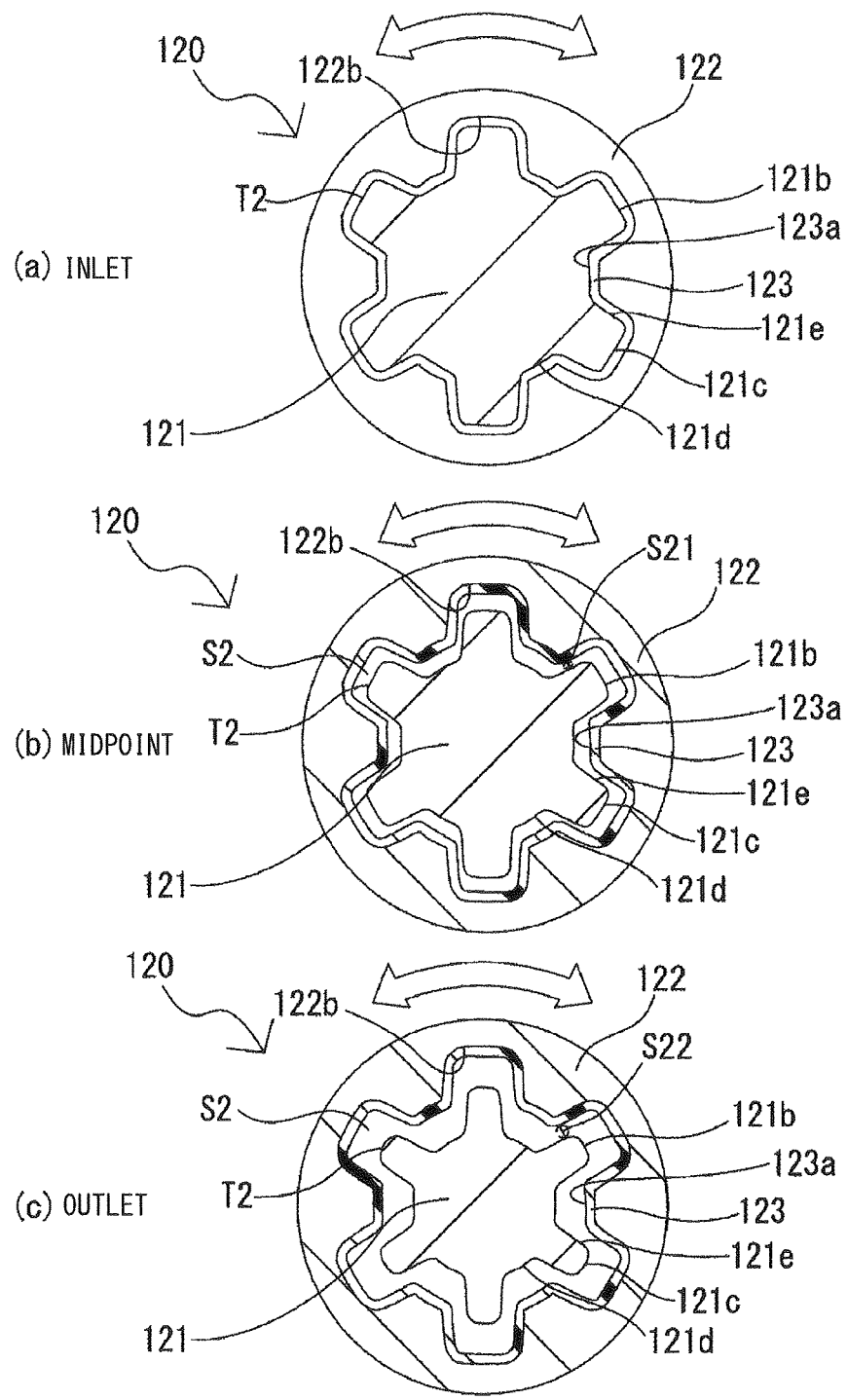
FIG. 10 depicts (a) a section view taken along an arrowed line F-F shown in FIG. 9, (b) a section view taken along an arrowed line G-G shown in FIG. 9, and (c) a section view taken along an arrowed line H-H shown in FIG. 9.

FIG. 10 depicts (a) a section view taken along an arrowed line F-F shown in FIG. 9, and shows a section view of only the male component (121). As shown in (a) of FIG. 10, in the initial state where the male component (121) is inserted into the female component (122), an entire surface of the outer peripheral part (121b) (the male spline parts (121c) and male spline bottom parts (121d)) of the male component (121) abuts on the inner peripheral part (123a) of the elastic member (123), which faces the outer peripheral part (121b), substantially without any gaps at an inlet of the female component (122) to be inserted with the male component (121). The elastic member (123) is configured such that the elastic member (123) subjected to transformation caused by rotation of the male component (121) can escape toward a deeper side in an insertion direction (toward an outlet side of the female component (122)) of the male component (121).

It is preferable that the sides (121e) of the male spline parts (121c) abut on the elastic member (123) substantially without any gaps at an inlet (see (a) of FIG. 10), but it is not necessarily required that the entire surface of the outer peripheral part (121b) of the male component (121) abut on the elastic member (123). For example, as shown in a shaft structure (620) in (a) of FIG. 26 as a modified example of this embodiment, gaps S7 may be generated between tops T6 of female spline parts (622b) and an inner peripheral part (623a) of an elastic member (623).

Figure 26:
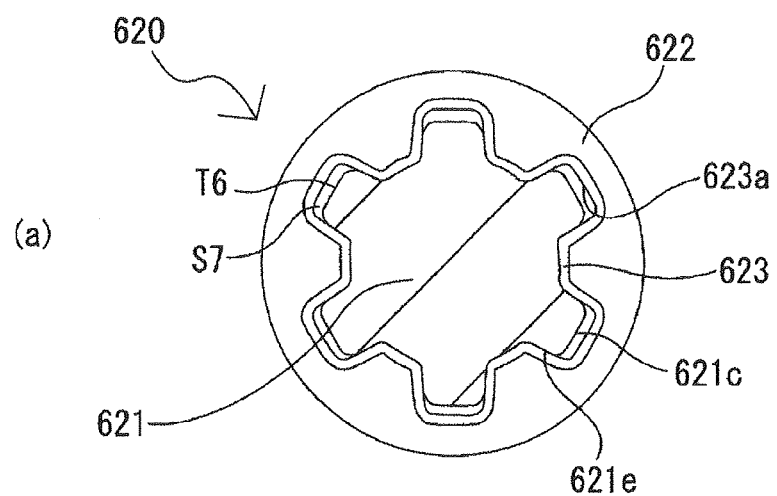
FIG. 26 depicts (a) a view showing a modified example of the shaft structure as the second embodiment of the present invention, and (b) a view showing another modified example of the shaft structure as the second embodiment of the present invention.
Figure 26:
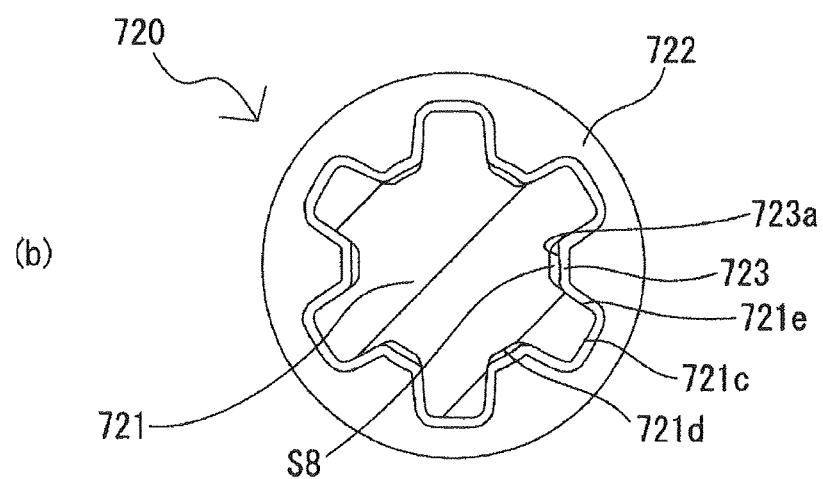

Further, as shown in a shaft structure (720) in (b) of FIG. 26 as another modified example of this embodiment, gaps S8 may be generated between male spline bottom parts (721d) and an inner peripheral part (723a) of the elastic member (723). Still further, the gaps may be generated between the male spline bottom parts and the outer peripheral part of the elastic member facing the male spline bottom parts in a further modified example in (a) of FIG. 26 such as S8 shown in (b) of FIG. 26. Still further, the gaps may be generated between the tops of the male spline parts and the outer peripheral part of the elastic member facing the tops of the male spline parts in a further modified example in (b) of FIG. 26 such as S7 shown in (a) of FIG. 26.

FIG. 10 depicts (b) a section view taken along an arrowed line G-G shown in FIG. 9. As shown in (b) of FIG. 10, in the initial state where the male component (121) is inserted into the female component (122), second gaps S21 are generated, in a circumferential direction at a midpoint of the female component (122), between the sides (121e) of the male spline parts (121c) and the inner peripheral part (123a) of the elastic member (123) facing the sides (121e) of the male spline parts (121c).

FIG. 10 depicts (c) a section view taken along an arrowed line H-H shown in FIG. 9. As shown in (c) of FIG. 10, in the initial state where the male component (121) is inserted into the female component (122), second gaps S22 larger than the second gaps S21 (see (b) of FIG. 10) are generated, in a circumferential direction at an outlet of the female component (122), between the sides (121e) of the male spline parts (121c) and the inner peripheral part (123a) of the elastic member (123) facing the sides (121e) of the male spline parts (121c).

As shown in (a) to (c) of FIG. 10, in the initial state where the male component (121) is inserted into the female component (122), second gaps S2 (S21, S22) generated between the sides (121e) of the male spline parts (121c) and the inner peripheral parts (123a) of the elastic member (123) increases in size along an insertion direction (toward an outlet side of the female component (122)) of the male component (121). By virtue of such a configuration, when the male component (121) is rotated in a circumferential direction (each direction shown by a thick white arrow in (a) to (c) of FIG. 10) from the initial state shown in (a) to (c) of FIG. 10, an elapsed period of time until the sides (122e) of the male spline parts (121c) abut on the inner peripheral parts (123a) of the elastic member (123) can be made longer with increase in depth along an insertion direction (toward an outlet side of the female component (122)) of the male component (121).

(Press Motion in Embodiment)

When the male component (121) is rotated in a circumferential direction (each direction shown by a thick white arrow in (a) to (c) of FIG. 10) from the initial state shown in (a) to (c) of FIG. 10, an initial stiffness starts being developed at an inlet (see (a) of FIG. 10), and the sides (121e) of the male spline parts (121c) on the outer peripheral part (121b) of the male component (121) are caused to press the sides of the female spline parts (122b) through the elastic member (123). When the male component (121) is rotated by a predetermined angle, the elastic member (123) abuts on a part of the sides (121e), after the above state at an inlet (see (a) of FIG. 10), with respect to a portion from an inlet (see (a) FIG. 10) toward a midpoint (see (b) of FIG. 10) in a continuous manner, which results in a gradual increase in contact area between the elastic member (123) and the sides (121e).

Subsequently, when the male component (121) is rotated further by a predetermined angle, the elastic member (123) abuts further on a part of the sides (121e), after the above state at a midpoint (see (b) of FIG. 10), with respect to a portion from a midpoint (see (b) of FIG. 10) toward an outlet (see (c) of FIG. 10) in a continuous manner, which results in a gradual increase in contact area between the elastic member (123) and the sides (121e).

Still subsequently, at an outlet (see (c) of FIG. 10), the sides (121e) are caused to press the inner peripheral parts (122a) of the female component (122), through the elastic member (123), with respect to a portion in the vicinity of tops T2 of the male spline parts (121c) out of an entire portion of the sides (121e), until the elastic member (123) completes transformation. When the elastic member (123) completes transformation at an outlet, an initial stiffness changes into a secondary stiffness, and a pressure from the outer peripheral part (121b) of the male component (121) starts being transmitted directly to the inner peripheral part (122a) of the female component (122).

By virtue of the above mechanism where the elastic member (123) and the sides (121e) abut on each other with time differences i.e. increase gradually in contact area therebetween with respect to a portion from an inlet (see (a) of FIG. 10) toward an outlet (see (c) of FIG. 10) when the male component (121) is rotated, an initial stiffness developed when the male component (121) is rotated increases gently so that the female component (122) can be rotated smoothly in a circumferential direction (each direction shown by a thick white arrow in (a) to (c) of FIG. 10). Subsequently, the elastic member (123) completes transformation at an outlet, and the outer peripheral part (121b) of the male component (121) starts transmitting pressure directly to the inner peripheral part (122a) of the female component (122), and therefore, an operator can rotate the female component (122) by a desired angle in conjunction with the male component (121) so that a pinion gear (104) (see FIG. 7) can be rotated by a desired angle.

For the realization of such a mechanism, it is preferable that when the male component (121) is rotated in a state where it is inserted into the female component (122), a shifting range of the male component (121) in an axial direction is limited within a predetermined range such that a relative position gap of the male component (121) with respect to the female component (122) is not generated. It is further preferable that the male component (121) does not pull out of the female component (122).

(Features of Shaft Structure of Second Embodiment)

In the construction above, when the male component (121) is rotated in the initial state where it is inserted into the female component (122), the sides (121e) of the male spline parts (121c) and the elastic member (123) abut on each other with a predetermined time difference between: a position where gaps between the sides (121e) of the male spline parts (122c) and the elastic member (123) (second gaps S2 in a circumferential direction) are large (at an outlet in this embodiment, see (c) of FIG. 10); and a position where the gaps are small (at e.g. a midpoint in this embodiment, see (b) of FIG. 10). Accordingly, an initial stiffness (a stiffness developed until the elastic member (123) completes transformation, or a stiffness developed until the elastic member (123) completes absorption of a pressure from the male component (121)), when the male component (121) is rotated, is allowed to increase gently. Consequently, an initial stiffness when the male component (121) is rotated can be further reduced, in comparison with a conventional one, so as to suppress a sudden transmission of a large power to the shaft (103), thereby capable of preventing the operator's abnormal feelings of reduced control (abnormal feelings suffered from by the operator when the force required for the operator to handle the steering wheel (102) decreases drastically immediately after the operator starts handling the steering wheel (102)).

Further, in the construction above, the outer peripheral part (121b) of the male component (121) has a tapered form narrowing along an insertion direction of the male component (121), and therefore, second gaps S2 can easily be formed such that a clearance between the sides (121e) of the male spline parts (121c) and the sides-facing outer peripheral part (123b) of the elastic member (123) increases with increase in depth in an insertion direction of the male component (121). As a result, an elapsed period of time until the sides (121e) of the male spline parts (121c) abut on the elastic member (123) when the male component (121) is rotated can be made longer with increase in depth along an insertion direction of the male component (121) (toward an outlet side of the female component (122)). Consequently, when the male component (121) is rotated, the sides (121e) of the male spline parts (121c) are caused to press the sides of the female spline parts (122b) through the elastic member (123), with predetermined time differences, along a direction from a front side (an inlet side) to a back side (an outlet side), which results in surely achieving the advantageous effects of a gentle increase in stiffness from an initial stiffness when the male component (121) is rotated.

When the male component (121) is rotated in a state where it is inserted into the female component (122), a power of the rotation is transmitted to the female component (122) so as to transform the elastic member (123). During this movement, the elastic member (123) rubs abrasively against the outer peripheral part (121b) of the male component (121). Furthermore, such abrasive rubbing between the elastic member (123) and the outer peripheral part (121b) of the male component (121) occurs in a repetitive manner, every time the male component (121) is rotated to the right and left, and further, in a frequently changed direction. Under these conditions, if fabric covering the surface of the inner peripheral part (122a) of the female component (122) is an ordinary fabric without any treatment, it would soon wear away, which would raise a problem in torque transmission. In the second embodiment, when a rubber- or resin-impregnated fabric is used as the elastic member (123), by virtue of covering the inner peripheral part (122a) of the female component (122) with the fabric, the abrasion of the elastic member (123) can be reduced, and the life of the shaft structure (120) can be lengthened.

Further, the shaft structure in the construction above has a degree of vertical and horizontal freedom, at a midpoint and at an outlet, relative to an insertion direction of the male component (121) based on an inlet as a supporting point as shown in FIG. 9, thereby capable of achieving the auxiliary advantageous effects of easy installation of a worm gear or the like.

Still further, the male component (121) and the female component (122) are configured such that gaps between the sides (121e) of the male spline parts (121c) and the sides-facing outer peripheral part (123b) of the elastic member (123) increase with increase in depth along an insertion direction of the male component (121); however, an entire surface of the outer peripheral part (121b) (the male spline parts (121c) and the male spline bottom parts (121d)) of the male component (121) and the inner peripheral part (123a) of the elastic member (123) abut on each other substantially without any gaps at some point (in the vicinity of an inlet, in this case) in an axial direction, thereby capable of suppressing wobbling to be generated between the male component (121) and the female component (122).

Third Embodiment

Next, hereinafter, a shaft structure (spline) as well as a male component (male spline shaft) and a female component (female spline shaft), both components making up the shaft structure, in a third embodiment of the present invention will be described with reference to FIGS. 13-18. Note that detailed descriptions of the parts (201) to (215), (217), and (218) in the second embodiment will be omitted because they are the same as the above-described parts (1) to (15), (17), and (18) in the first embodiment, respectively.

(Outlined Structure of Electric Power Steering Device)

Figure 13:
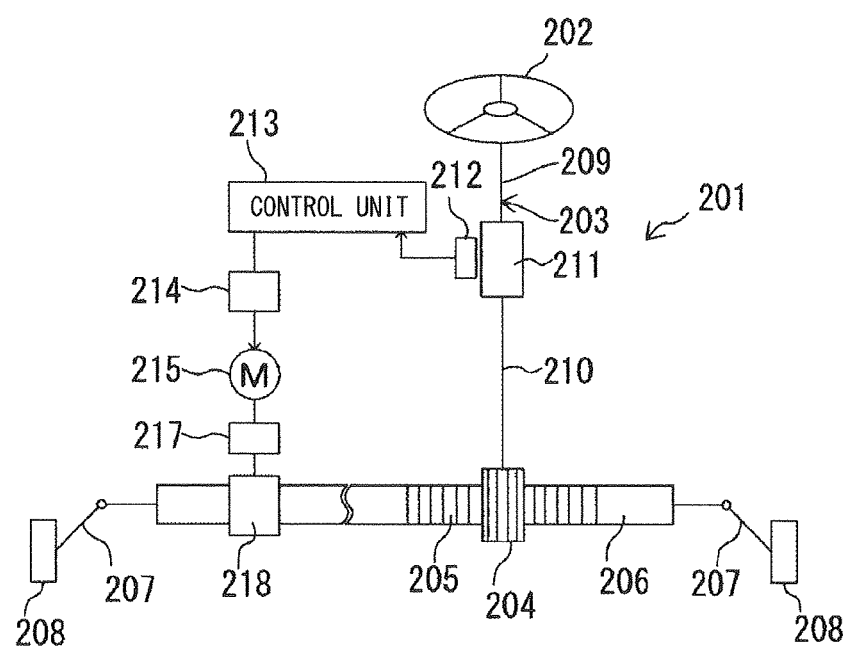
FIG. 13 depicts an example of schematic diagram showing an electric power steering device applied with a shaft structure as a third embodiment of the present invention.

As shown in FIG. 13, the electric power steering device (EPS) (201) includes: a steering shaft (shaft) (202) connected to a steering wheel (203) as a steering component; and a rack shaft (206) having a pinion gear (204) disposed on an end of the steering shaft (203) and a rack gear (205) engaged with the pinion gear (204), where the rack shaft (206) can serve as a steering shaft extended in a lateral direction of the vehicle.

(Structure of Shaft Structure)

The shaft structure in an embodiment described above is applied e.g. to the steering shaft (203) described above (hereinafter, occasionally referred to as "shaft (203)" for short).

The shaft structure (220) according to the present invention is installed on a shaft (203) capable of making a power-transmission. The male and female components capable of making a power-transmission are configured such that the male component is slidably inserted into the female component in an axial direction, thereby making up such a shaft structure (221). The shaft structure (220), as shown in (a) of FIG. 14, includes a metallic male component (221), a metallic female component (222), and an elastic member (223) arranged such that a surface of an outer peripheral part (221b) of the male component (221) is covered with it.

Figure 15:
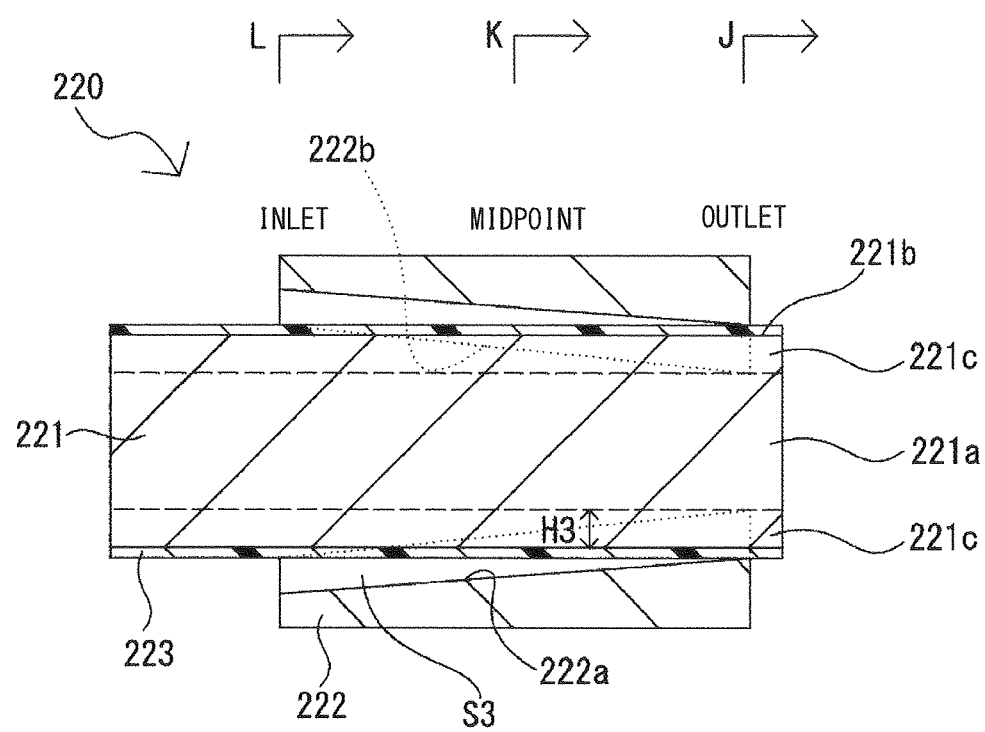
FIG. 15 depicts an enlarged section view taken along an arrowed line I-I of (b) shown in FIG. 14.
Figure 17:
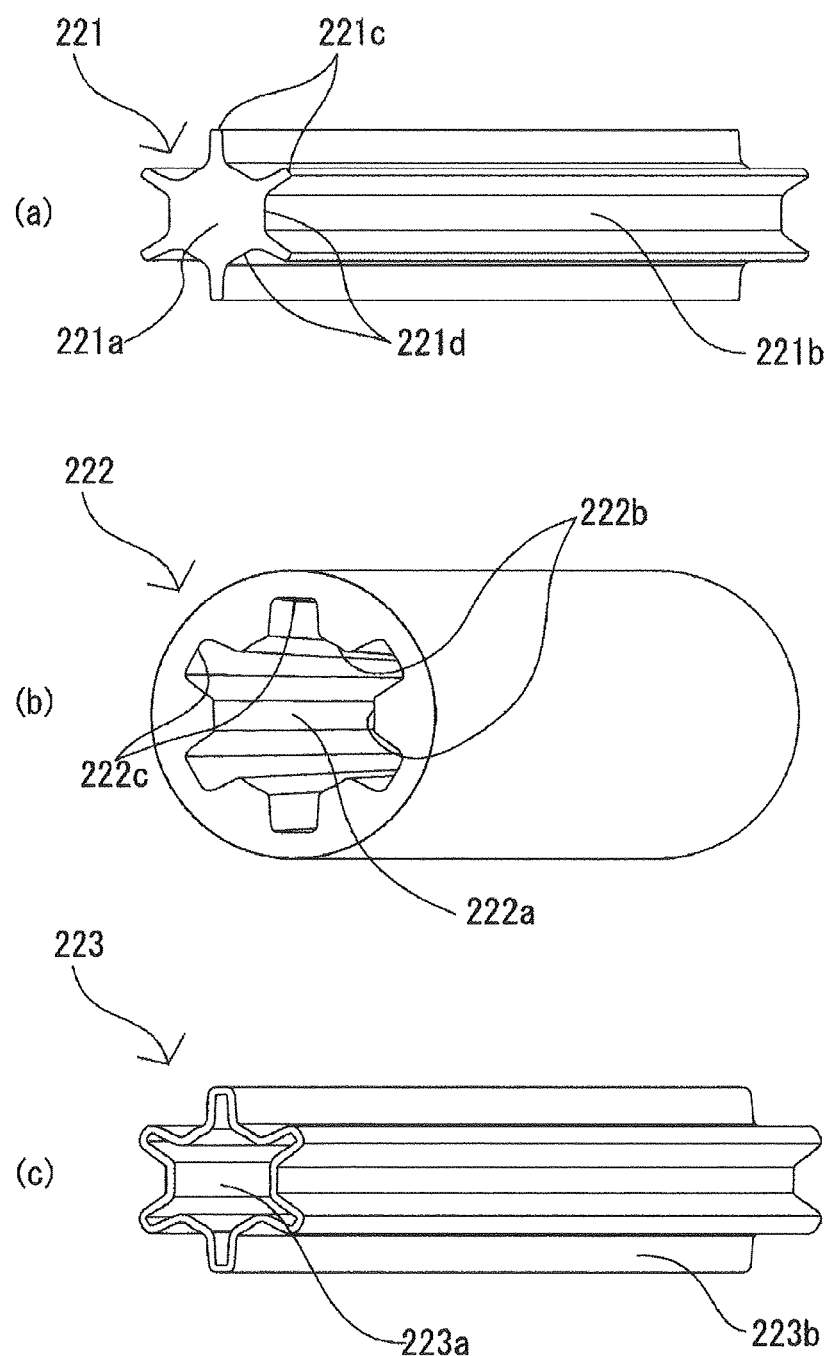
FIG. 17 depicts an exploded perspective view showing main parts of the shaft structure as the third embodiment of the present invention, which main parts include (a) an example of male component, (b) an example of female component, and (c) an example of elastic member to be arranged on an outer peripheral part of the male component.

The male component (221), as shown in (a) of FIG. 17, includes an axial core part (221a). The outer peripheral part (221b) is formed with: e.g. six male spline parts (221d) arranged at predetermined intervals in a circumferential direction of the axial core part (221a); and e.g. six male spline bottom parts (221d) each arranged between a pair of the adjacent male spline parts (221c). As shown in FIG. 15, the male spline parts (221c) are substantially the same in height H3 as each other in a radial direction over an axial direction of the male component (221). The dashed lines in FIG. 15 indicate a boundary between the axial core part (221a) and the male spline parts (221c).

The female component (222), as shown in (b) of FIG. 17, has an inner peripheral part (222a) configured such that the male component (221) having the outer peripheral part (221b) covered with the elastic member (223) (see (c) of FIG. 17) can be inserted into the inner peripheral part (222a). As shown in FIG. 15, the inner peripheral part (222a) has a tapered form narrowing along an insertion direction (a direction shown by a thick white arrow in FIG. 15) of the male component (221). On the inner peripheral part (222a) of the female component (222), as shown in (b) of FIG. 17, six female spline parts (222b) (the number of these spline parts is the same as that of the male spline parts (221c) formed on the outer peripheral part (221b) of the male component (221), therefore six in this embodiment) are formed at predetermined intervals in a circumferential direction of the female component (222). The outline of the female spline parts (222b) is drawn with dotted lines and solid lines in FIG. 15. As shown in (b) of FIG. 17, on the inner peripheral part (222a) of the female component (222), six female spline bottom parts (222c) (the number of these spline bottom parts is the same as that of the male spline bottom parts (221d), therefore six in this embodiment) are formed between a pair of the adjacent female spline parts (222b). Each of the female spline bottom parts (222c) is substantially U-shaped in cross section perpendicular to an axial direction.

The elastic member (223) can be made of material similar to that used for the elastic member (223) in the first embodiment. Further, the elastic member (223) can be made of fabric impregnated with rubber or resin in a similar manner for the elastic member (223) in the first embodiment.

Figure 18:
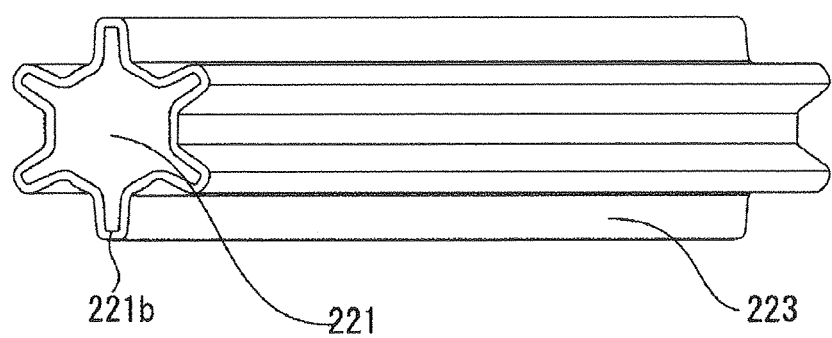
FIG. 18 depicts a perspective view of the male component, as the third embodiment of the present invention, having an elastic member adhered to the outer peripheral part of the male component with glue.

As shown in (c) of FIG. 17, the elastic member (223) has an inner peripheral part (223a) substantially the same in shape as the outer peripheral part (221b) of the male component (221) (see (a) of FIG. 17), and an outer peripheral part (223b) capable of being inserted into the inner peripheral part (222a) of the female component (222) (see (b) of FIG. 17). In this embodiment, as shown in FIG. 18, the elastic member (223) is adhered to the outer peripheral part (221b) of the male component (221). The adhesive used here may be the same as those used in the first embodiment.

Figure 14:
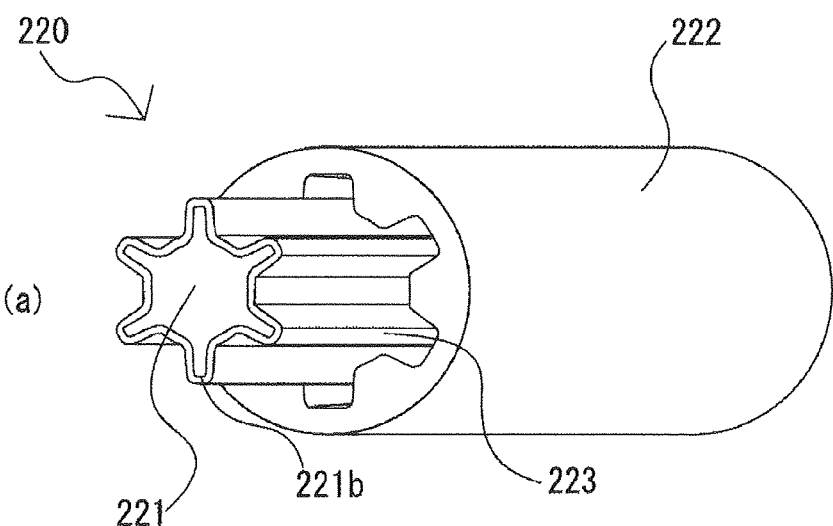
FIG. 14 depicts (a) an example of perspective view of the shaft structure as the third embodiment of the present invention, and (b) a front view of the shaft structure of (a).
Figure 14:
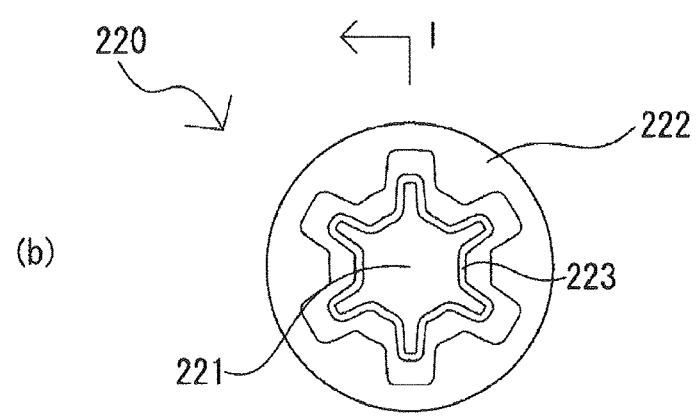
Figure 14:

FIG. 15 depicts an enlarged section view taken along an arrowed line I-I of (b) shown in FIG. 14, which is indicative of the initial state where the male component (221) is inserted into the female component (222). As shown in FIG. 15, the shaft structure (220) in this embodiment, in the initial state where the male component (221) is inserted into the female component (222), has first gaps S3. The first gaps S3 (blank parts in FIG. 15) defined by the inner peripheral part (222a) of the female component (222) and the elastic member (223) extend over an entire length of the female component (222) in an axial direction as shown in FIG. 15. As will be described later in detail, the first gaps S3 are formed such that a clearance between the sides (222d) of the female spline parts (222b) and the elastic member (223) changes along an insertion direction (a direction shown by a thick white arrow in FIG. 15) of the male component (221).

Figure 16:
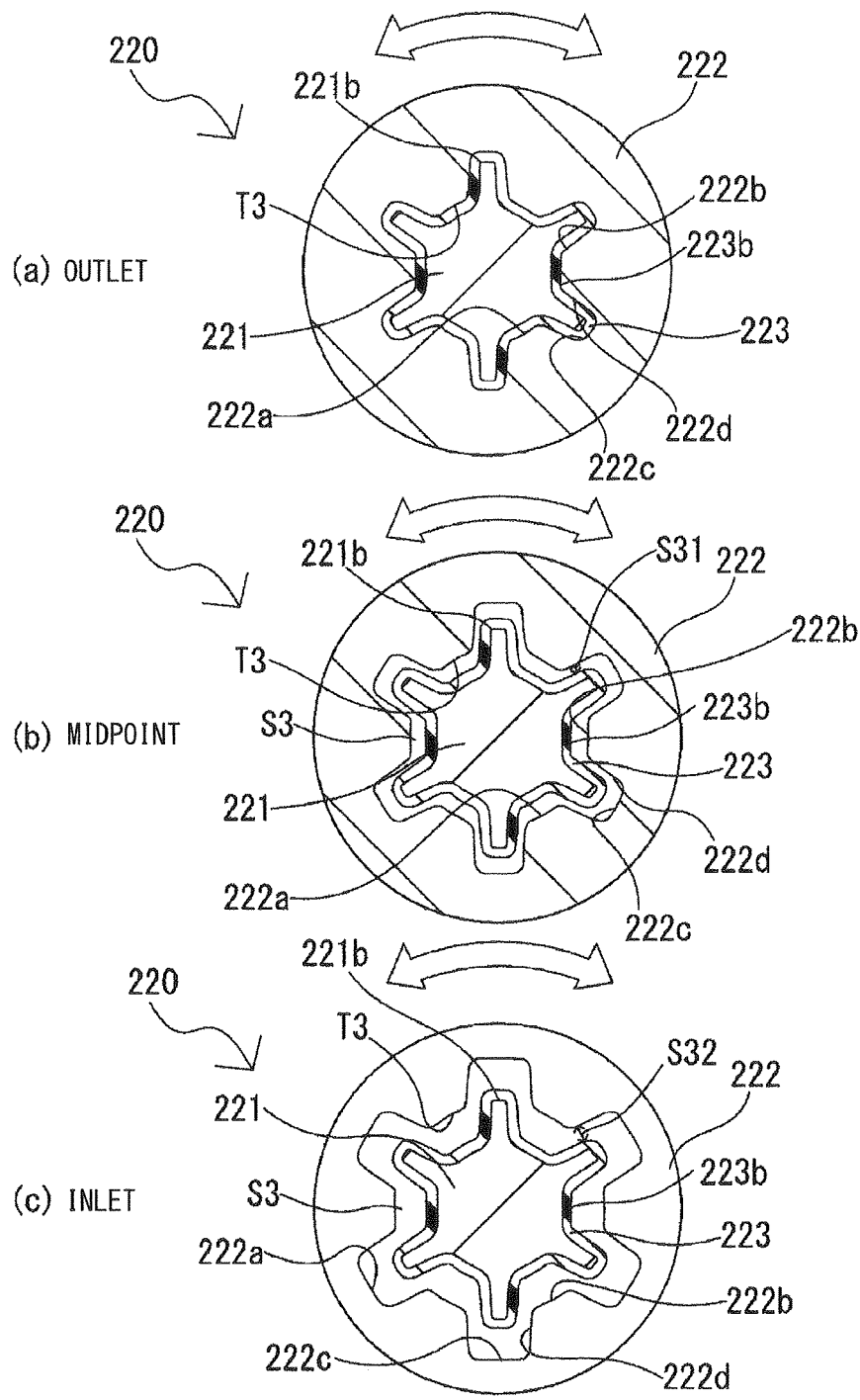
FIG. 16 depicts (a) a section view taken along an arrowed line J-J shown in FIG. 15, (b) a section view taken along an arrowed line K-K shown in FIG. 15, and (c) a section view taken along an arrowed line L-L shown in FIG. 15.

FIG. 16 depicts (a) a section view taken along an arrowed line J-J shown in FIG. 15. As shown in (a) of FIG. 16, in the initial state where the male component (221) is inserted into the female component (222), an entire surface of the inner peripheral part (222a) (the female spline parts (222b) and female spline bottom parts (222c)) of the female component (222) abuts on the outer peripheral part (223b) of the elastic member (223), which faces the inner peripheral part (222a), substantially without any gaps at an outlet of the female component (222) that is a deeper side in an insertion direction of the male component (221). The elastic member (223) is configured such that the elastic member (223) subjected to transformation caused by rotation of the male component (221) can escape toward a deeper side in an insertion direction (toward an inlet side of the female component (222)) of the male component (221).

It is preferable that the sides (222d) of the female spline parts (222b) abut on the elastic member (223) substantially without any gaps at an outlet (see (a) of FIG. 16), but it is not necessarily required that the entire surface of the inner peripheral part (222a) of the female component (222) abut on the elastic member (223). For example, in a similar manner for a shaft structure (420) (see (a) of FIG. 25) as a modified example of the first embodiment, gaps may be generated between tops T3 of female spline parts (222b) and an outer peripheral part (223b) of the elastic member (223). Further, for example, in a similar manner for a shaft structure (520) (see (b) of FIG. 25) as another modified example of the first embodiment, the gaps may be generated between the female spline bottom parts (222c) and the outer peripheral part (223b) of the elastic member (223). Both gaps may be generated between the tops T3 of female spline parts (222b) and the elastic member (223), and between the female spline bottom parts (222c) and the elastic member (223), respectively.

FIG. 16 depicts (b) a section view taken along an arrowed line K-K shown in FIG. 15. As shown in (b) of FIG. 16, in the initial state where the male component (221) is inserted into the female component (222), first gaps S31 are generated, in a circumferential direction at a midpoint of the female component (222), between the sides (222d) of the female spline parts (222b) and the outer peripheral part (223b) of the elastic member (223) facing the sides (222d) of the female spline parts (222b).

FIG. 16 depicts (c) a section view taken along an arrowed line L-L shown in FIG. 15, and shows a section view of only the male component (221) and the elastic member (223). As shown in (c) of FIG. 16, in the initial state where the male component (221) is inserted into the female component (222), first gaps S32 larger than the first gaps S31 (see (b) of FIG. 16) are generated, in a circumferential direction at an inlet of the female component (222), between the sides (222d) of the male spline parts (222b) and the outer peripheral part (223b) of the elastic member (223) facing the sides (222d) of the male spline parts (222b).

As shown in (a) to (c) of FIG. 16, in the initial state where the male component (221) is inserted into the female component (222), first gaps S3 (S31, S32) generated between the sides (222d) of the female spline parts (222b) and the outer peripheral parts (223b) of the elastic member (223) decreases in size with increase in depth along an insertion direction (toward an outlet side of the female component (222)) of the male component (221). In such a manner, the first gaps S3 are formed such that a clearance (e.g. S32, S31) between the sides (222d) of the female spline parts (222b) and the outer peripheral part (223b) of the elastic member (223) decreases in size with increase in depth along an insertion direction of the male component (221). By virtue of such a configuration, when the male component (221) is rotated in a circumferential direction (each direction shown by a thick white arrow in (a) to (c) of FIG. 16) from the initial state shown in (a) to (c) of FIG. 16, an elapsed period of time until the sides (222d) of the female spline parts (222b) abut on the outer peripheral parts (223b) of the elastic member (223) can be made shorter with increase in depth along an insertion direction (toward an outlet side of the female component (222)) of the male component (221).

(Press Motion in Embodiment)

When the male component (221) is rotated in a circumferential direction (each direction shown by a thick white arrow in (a) to (c) of FIG. 16) from the initial state shown in (a) to (c) of FIG. 16, an initial stiffness starts being developed at an outlet (see (a) of FIG. 16), and the sides of the male spline parts (221c) on the outer peripheral part (221b) of the male component (221) are caused to press the sides (222d) of the female spline parts (222b) through the elastic member (223). When the male component (221) is rotated by a predetermined angle, the elastic member (223) abuts on a part of the sides (222d), after the above state at an outlet (see (a) of FIG. 16), with respect to a portion from an outlet (see (a) FIG. 16) toward a midpoint (see (b) of FIG. 16) in a continuous manner, which results in a gradual increase in contact area between the elastic member (223) and the sides (222d).

Subsequently, when the male component (221) is rotated further by a predetermined angle, the elastic member (223) abuts further on a part of the sides (222d), after the above state at a midpoint (see (b) of FIG. 16), with respect to a portion from a midpoint (see (b) of FIG. 16) toward an inlet (see (c) of FIG. 16) in a continuous manner, which results in a gradual increase in contact area between the elastic member (223) and the sides (222d).

Still subsequently, at an inlet (see (c) of FIG. 16), the outer peripheral parts (221b) of the male component (221) are caused to press the sides (222d) through the elastic member (223), with respect to a portion in the vicinity of tops T3 of the female spline parts (222b) out of an entire portion of the sides (222d), until the elastic member (223) completes transformation. When the elastic member (223) completes transformation at an inlet, an initial stiffness changes into a secondary stiffness, and a pressure from the outer peripheral part (221b) of the male component (221) starts being transmitted directly to the inner peripheral part (222a) of the female component (222).

By virtue of the above mechanism where the elastic member (223) and the sides (222d) abut on each other with time differences i.e. increase gradually in contact area therebetween with respect to a portion from an outlet (see (a) of FIG. 16) toward an inlet (see (c) of FIG. 16) when the male component (221) is rotated, an initial stiffness developed when the male component (221) is rotated increases gently so that the female component (222) can be rotated smoothly in a circumferential direction (each direction shown by a thick white arrow in (a) to (c) of FIG. 16). Subsequently, the elastic member (223) completes transformation at an inlet, and the outer peripheral part (221b) of the male component (221) starts transmitting pressure directly to the inner peripheral part (222a) of the female component (222), and therefore, an operator can rotate the female component (222) by a desired angle in conjunction with the male component (221) so that a pinion gear (204) (see FIG. 13) can be rotated by a desired angle.

For the realization of such a mechanism, it is preferable that when the male component (221) is rotated in a state where it is inserted into the female component (222), a shifting range of the male component (221) in an axial direction is limited within a predetermined range such that a relative position gap of the male component (121) with respect to the female component (222) is not generated. It is further preferable that the male component (221) does not pull out of the female component (122).

(Features of Shaft Structure of Third Embodiment)

In the construction above, when the male component (221) is rotated in the initial state where it is inserted into the female component (222), the sides (222d) of the female spline parts (222b) and the elastic member (223) abut on each other with a predetermined time difference between: a position where gaps between the sides (222d) of the female spline parts (222b) and the elastic member (223) (first gaps S3 in a circumferential direction) are large (at an inlet in this embodiment, see (c) of FIG. 16); and a position where the gaps are small (at e.g. a midpoint in this embodiment, see (b) of FIG. 16). Accordingly, an initial stiffness (a stiffness developed until the elastic member (223) completes transformation, or a stiffness developed until the elastic member (223) completes absorption of a pressure from the male component (221)), when the male component (221) is rotated, is allowed to increase gently. Consequently, an initial stiffness when the male component (221) is rotated can be further reduced, in comparison with a conventional one, so as to suppress a sudden transmission of a large power to the shaft (203), thereby capable of preventing the operator's abnormal feelings of reduced control (abnormal feelings suffered from by the operator when the force required for the operator to handle the steering wheel (202) decreases drastically immediately after the operator starts handling the steering wheel (202)).

Further, in the construction above, the inner peripheral part (222a) of the female component (222) has a tapered form narrowing along an insertion direction of the male component (221), and therefore, first gaps S3 can easily be formed such that a clearance between the sides (222d) of the female spline parts (222b) and the outer peripheral part (223b) of the elastic member (223) decreases with increase in depth in an insertion direction of the male component (221). As a result, an elapsed period of time until the sides (222d) of the female spline parts (222b) abut on the elastic member (223) when the male component (221) is rotated can be made shorter with increase in depth along an insertion direction of the male component (221) (toward an outlet side of the female component (222)). Consequently, when the male component (221) is rotated, the sides of the male spline parts (221c) are caused to press the sides (222d) of the female spline parts (222b), through the elastic member (223), with predetermined time differences, along a direction from a back side (an outlet side) to a front side (an inlet side), which results in surely achieving the advantageous effects of a gentle increase in stiffness from an initial stiffness when the male component (221) is rotated.

When the male component (221) is rotated in a state where it is inserted into the female component (222), a power of the rotation is transmitted to the female component (222) so as to transform the elastic member (223). During this movement, the elastic member (223) rubs abrasively against the inner peripheral part (222a) of the female component (222). Furthermore, such abrasive rubbing between the elastic member (223) and the inner peripheral part (222a) of the female component (222) occurs in a repetitive manner, every time the male component (221) is rotated to the right and left, and further, in a frequently changed direction. Under these conditions, if fabric covering the surface of the outer peripheral part (222b) of the male component (221) is an ordinary fabric without any treatment, it would soon wear away, which would raise a problem in torque transmission. In the third embodiment, when a rubber- or resin-impregnated fabric is used as the elastic member (223), by virtue of covering the outer peripheral part (221b) of the male component (221) with the fabric, the abrasion of the elastic member (223) can be reduced, and the life of the shaft structure (220) can be lengthened.

Further, the shaft structure in the construction above has a degree of vertical and horizontal freedom, at an inlet and at a midpoint, relative to an insertion direction of the male component (221) based on an outlet as a supporting point as shown in FIG. 15, thereby capable of achieving the auxiliary advantageous effects of easy installation of a worm gear or the like.

Still further, the shaft structure in the construction above, in the initial state where the male component (221) is inserted into the female component (222), an entire surface of the inner peripheral part (222a) (the female spline parts (222b) and the female spline bottom parts (222c)) of the female component (222), and the outer peripheral part (223b) of the elastic member (223) facing the inner peripheral part (222a) abut on each other substantially without any gaps at some point (in the vicinity of an outlet, in this case) in an axial direction, thereby capable of suppressing wobbling to be generated between the male component (221) and the female component (222).

Fourth Embodiment

Next, hereinafter, a shaft structure (spline) as well as a male component (male spline shaft) and a female component (female spline shaft), both components making up the shaft structure, in a fourth embodiment of the present invention will be described with reference to FIGS. 19-24. Note that detailed descriptions of the parts (301) to (315), (317), and (318) in the second embodiment will be omitted because they are the same as the above-described parts (1) to (15), (17), and (18) in the first embodiment, respectively.

(Outlined Structure of Electric Power Steering Device)

Figure 19:
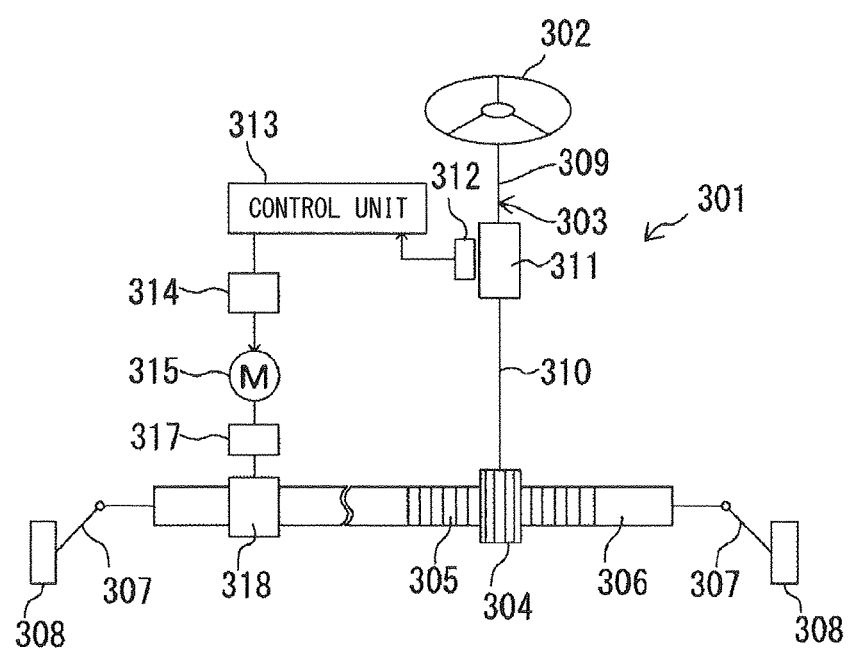
FIG. 19 depicts an example of schematic diagram showing an electric power steering device applied with a shaft structure as a fourth embodiment of the present invention.

As shown in FIG. 19, the electric power steering device (EPS) (301) includes: a steering shaft (shaft) (302) connected to a steering wheel (303) as a steering component; and a rack shaft (306) having a pinion gear (304) disposed on an end of the steering shaft (303) and a rack gear (305) engaged with the pinion gear (304), where the rack shaft (306) can serve as a steering shaft extended in a lateral direction of the vehicle.

(Structure of Shaft Structure)

The shaft structure in an embodiment described above is applied e.g. to the steering shaft (303) described above (hereinafter, occasionally referred to as "shaft (303)" for short).

The shaft structure (320) according to the present invention is installed on a shaft (303) capable of making a power-transmission. The male and female components capable of making a power-transmission are configured such that the male component is slidably inserted into the female component in an axial direction, thereby making up such a shaft structure (321). The shaft structure (320), as shown in (a) of FIG. 20, includes a metallic male component (321), a metallic female component (322), and an elastic member (323) arranged such that a surface of an outer peripheral part (321b) of the male component (321) is covered with it.

Figure 21:
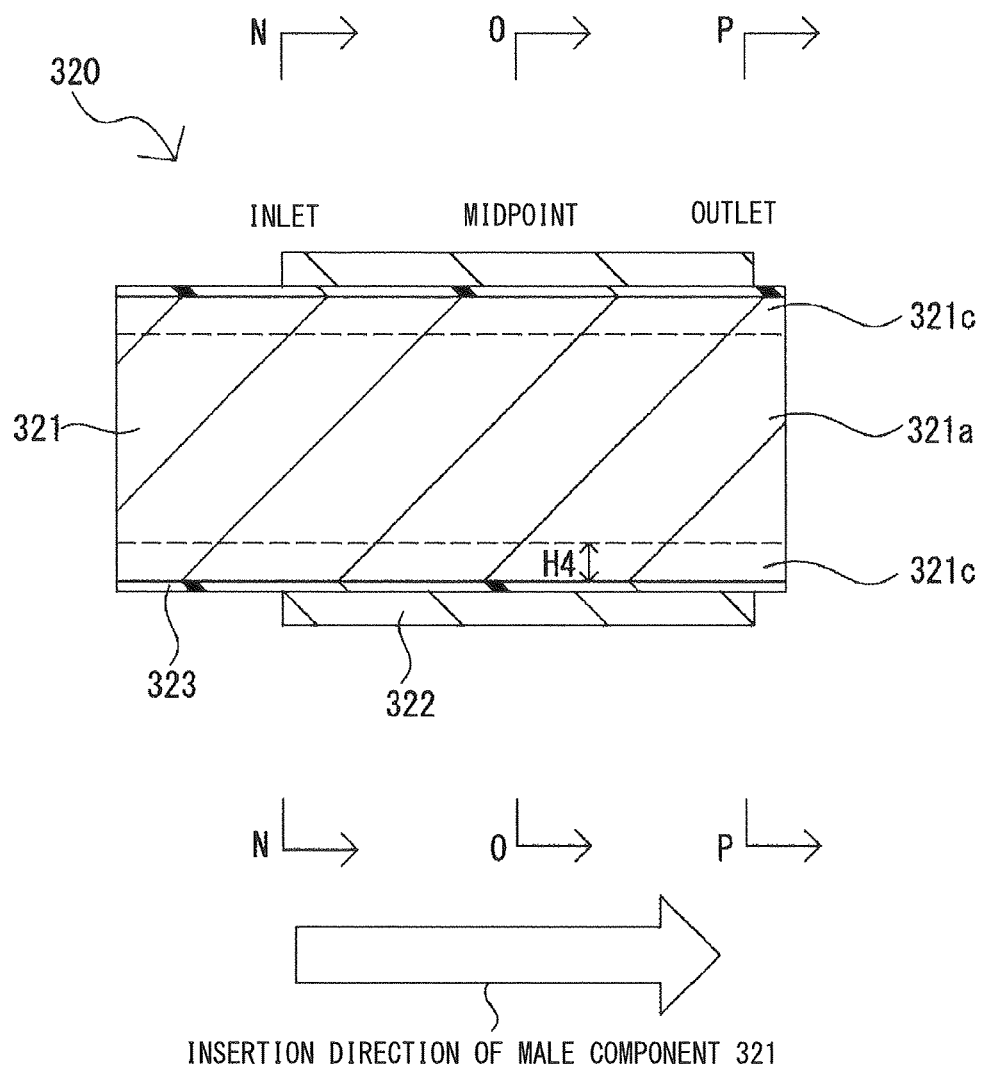
FIG. 21 depicts an enlarged section view taken along an arrowed line M-M of (b) shown in FIG. 20.
Figure 23:
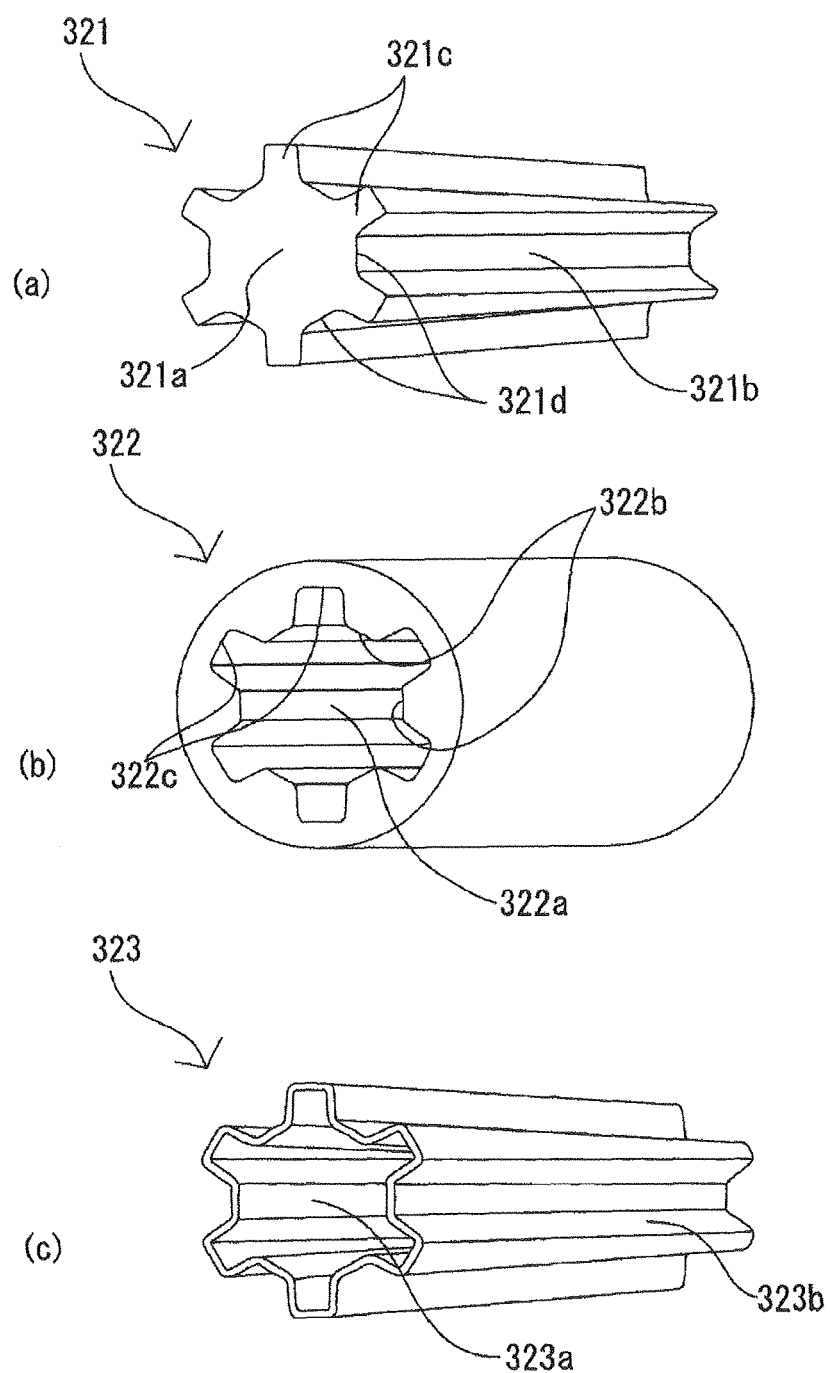
FIG. 23 depicts an exploded perspective view showing main parts of the shaft structure as the fourth embodiment of the present invention, which main parts include (a) an example of male component, (b) an example of female component, and (c) an example of elastic member to be arranged on an outer peripheral part of the male component.

The male component (321), as shown in (a) of FIG. 23, includes an axial core part (321a). The outer peripheral part (321b) is formed with: e.g. six male spline parts (321d) arranged at predetermined intervals in a circumferential direction of the axial core part (321a); and e.g. six male spline bottom parts (321d) each arranged between a pair of the adjacent male spline parts (321c). As shown in FIG. 21, the male spline parts (321c) are substantially the same in height H4 as each other in a radial direction over an axial direction of the male component (321). The dashed lines in FIG. 21 indicate a boundary between the axial core part (321a) and the male spline parts (321c).

The female component (322), as shown in (b) of FIG. 23, has an inner peripheral part (322a) configured such that the male component (321) having the outer peripheral part (321b) covered with the elastic member (323) (see (c) of FIG. 23) can be inserted into the inner peripheral part (322a). On the inner peripheral part (322a) of the female component (322), as shown in (b) of FIG. 23, six female spline parts (322b) (the number of these spline parts is the same as that of the male spline parts (321c) formed on the outer peripheral part (321b) of the male component (321), therefore six in this embodiment) are formed at predetermined intervals in a circumferential direction of the female component (322). As shown in (b) of FIG. 23, on the inner peripheral part (322a) of the female component (322), six female spline bottom parts (322c) (the number of these spline bottom parts is the same as that of the male spline bottom parts (321d), therefore six in this embodiment) are formed between a pair of the adjacent female spline parts (322b). Each of the female spline bottom parts (322c) is substantially U-shaped in cross section perpendicular to an axial direction.

The elastic member (323) can be made of material similar to that used for the elastic member (23) in the first embodiment. Further, the elastic member (323) can be made of fabric impregnated with rubber or resin in a similar manner for the elastic member (23) in the first embodiment.

Figure 24:
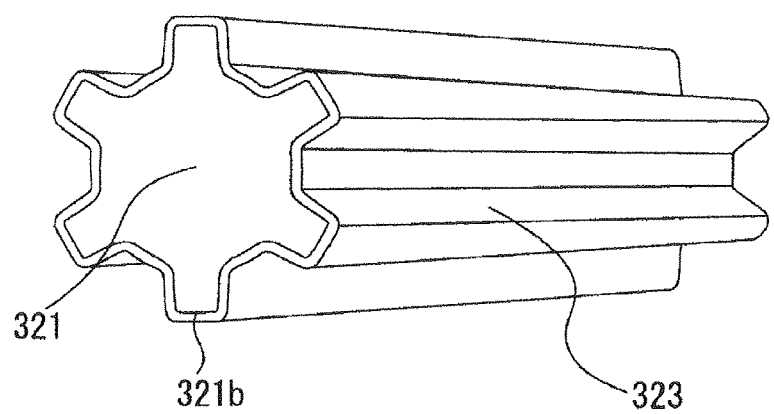
FIG. 24 depicts a perspective view of the male component, as the fourth embodiment of the present invention, having an elastic member adhered to the outer peripheral part of the male component with glue.

As shown in (c) of FIG. 23, the elastic member (323) has an inner peripheral part (323a) substantially the same in shape as the outer peripheral part (321b) of the male component (321) (see (a) of FIG. 23), and an outer peripheral part (323b) capable of being inserted into the inner peripheral part (322a) of the female component (322) (see (b) of FIG. 23). In this embodiment, as shown in FIG. 24, the elastic member (323) is adhered to the outer peripheral part (321b) of the male component (321). The adhesive used here may be the same as those used in the first embodiment.

Figure 20:
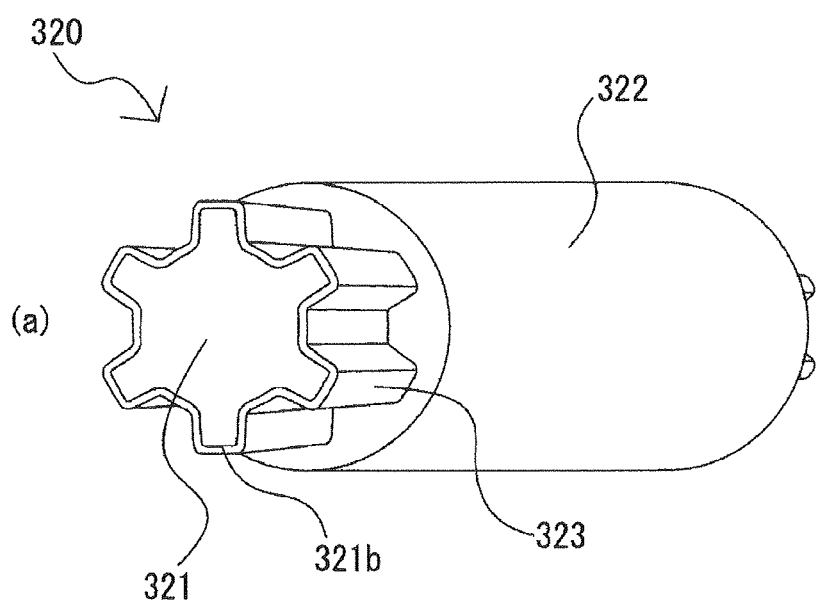
FIG. 20 depicts (a) an example of perspective view of the shaft structure as the fourth embodiment of the present invention, and (b) a front view of the shaft structure of (a).
Figure 20:
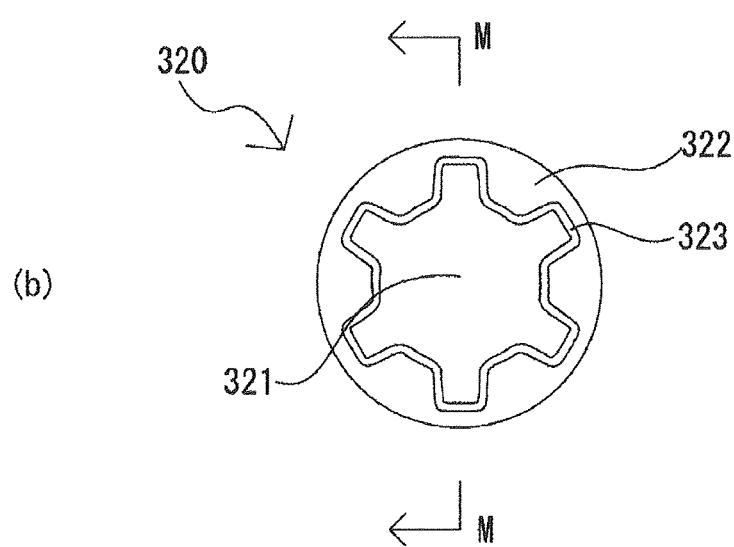

FIG. 21 depicts an enlarged section view taken along an arrowed line M-M of (b) shown in FIG. 20, which is indicative of the initial state where the male component (321) is inserted into the female component (322).

Figure 22:
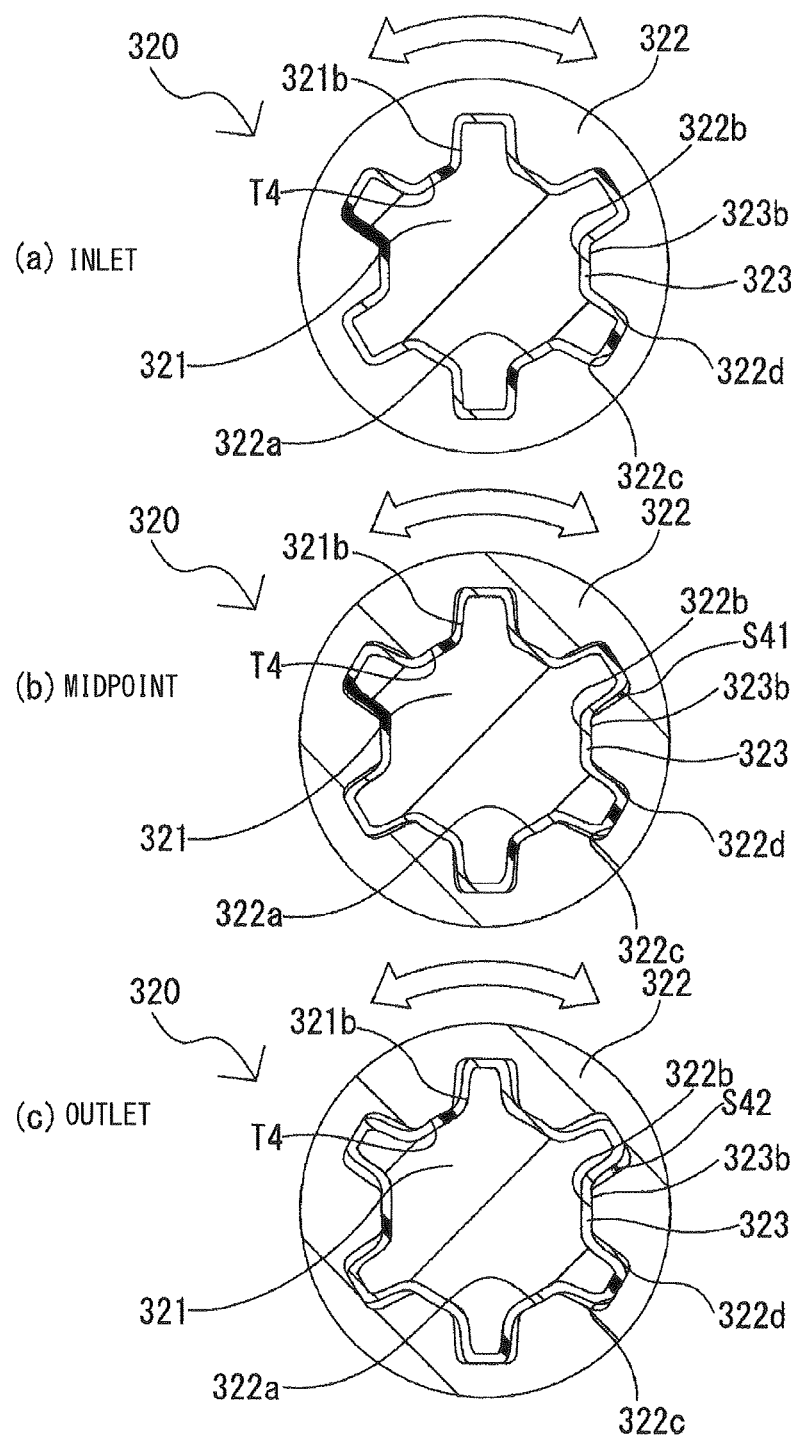
FIG. 22 depicts (a) a section view taken along an arrowed line N-N shown in FIG. 21, (b) a section view taken along an arrowed line O-O shown in FIG. 21, and (c) a section view taken along an arrowed line P-P shown in FIG. 21.

FIG. 22 depicts (a) a section view taken along an arrowed line N-N shown in FIG. 21, and shows a section view of only the male component (321) and the elastic member (323). As shown in (a) of FIG. 22, in the initial state where the male component (321) is inserted into the female component (322), an entire surface of the inner peripheral part (322a) (the female spline parts (322b) and female spline bottom parts (322c)) of the female component (322) abuts on the outer peripheral part (323b) of the elastic member (323), which faces the inner peripheral part (322a), substantially without any gaps at an inlet of the female component (322) that is a deeper side in an insertion direction of the male component (321). The elastic member (323) is configured such that the elastic member (223) subjected to transformation caused by rotation of the male component (321) can escape toward a deeper side in an insertion direction (toward an outlet side of the female component (322)) of the male component (321).

It is preferable that the sides (322d) of the female spline parts (322b) abut on the elastic member (323) substantially without any gaps at an inlet (see (a) of FIG. 22), but it is not necessarily required that the entire surface of the inner peripheral part (322a) of the female component (322) abut on the elastic member (323). For example, in a similar manner for a shaft structure (420) (see (a) of FIG. 25) as a modified example of the first embodiment, gaps may be generated between tops T4 of female spline parts (322b) and an outer peripheral part (323b) of the elastic member (323). Further, for example, in a similar manner for a shaft structure (520) (see (b) of FIG. 25) as another modified example of the first embodiment, the gaps may be generated between the female spline bottom parts (322c) and the outer peripheral part (323b) of the elastic member (323). Both gaps may be generated between the tops T4 of female spline parts (322b) and the elastic member (323), and between the female spline bottom parts (322c) and the elastic member (323), respectively.

FIG. 22 depicts (b) a section view taken along an arrowed line O-O shown in FIG. 21. As shown in (b) of FIG. 22, in the initial state where the male component (321) is inserted into the female component (322), first gaps S41 are generated, in a circumferential direction at a midpoint of the female component (322), between the sides (322d) of the female spline parts (322b) and the outer peripheral part (323b) of the elastic member (323) facing the sides (322d) of the female spline parts (322b).

FIG. 22 depicts (c) a section view taken along an arrowed line P-P shown in FIG. 21. As shown in (c) of FIG. 22, in the initial state where the male component (321) is inserted into the female component (322), first gaps S42 larger than the first gaps S41 (see (b) of FIG. 22) are generated, in a circumferential direction at an inlet of the female component (322), between the sides (322d) of the male spline parts (322b) and the outer peripheral part (323b) of the elastic member (323) facing the sides (322d) of the male spline parts (322b).

As shown in (a) to (c) of FIG. 22, in the initial state where the male component (321) is inserted into the female component (322), first gaps S4 (S41, S42) generated between the sides (322d) of the female spline parts (322b) and the outer peripheral parts (323b) of the elastic member (323) decreases in size with increase in depth along an insertion direction (toward an outlet side of the female component (322)) of the male component (321). In such a manner, the first gaps S3 are formed such that a clearance (e.g. S42, S41) between the sides (322d) of the female spline parts (322b) and the outer peripheral part (323b) of the elastic member (323) increases in size with increase in depth along an insertion direction of the male component (321). By virtue of such a configuration, when the male component (321) is rotated in a circumferential direction (each direction shown by a thick white arrow in (a) to (c) of FIG. 22) from the initial state shown in (a) to (c) of FIG. 22, an elapsed period of time until the sides (322d) of the female spline parts (322b) abut on the outer peripheral parts (323b) of the elastic member (323) can be made longer with increase in depth along an insertion direction (toward an outlet side of the female component (322)) of the male component (321).

(Press Motion in Embodiment)

When the male component (321) is rotated in a circumferential direction (each direction shown by a thick white arrow in (a) to (c) of FIG. 22) from the initial state shown in (a) to (c) of FIG. 22, an initial stiffness starts being developed at an inlet (see (a) of FIG. 22), and the sides of the male spline parts (321c) on the outer peripheral part (321b) of the male component (321) are caused to press the sides (322d) of the female spline parts (322b) through the elastic member (323). When the male component (321) is rotated by a predetermined angle, the elastic member (323) abuts on a part of the sides (322d), after the above state at an inlet (see (a) of FIG. 22), with respect to a portion from an inlet (see (a) FIG. 22) toward a midpoint (see (b) of FIG. 22) in a continuous manner, which results in a gradual increase in contact area between the elastic member (323) and the sides (322d).

Subsequently, when the male component (321) is rotated further by a predetermined angle, the elastic member (323) abuts further on a part of the sides (322d), after the above state at a midpoint (see (b) of FIG. 22), with respect to a portion from a midpoint (see (b) of FIG. 22) toward an outlet (see (c) of FIG. 22) in a continuous manner, which results in a gradual increase in contact area between the elastic member (323) and the sides (322d).

Still subsequently, at an outlet (see (c) of FIG. 22), the outer peripheral parts (321b) of the male component (321) are caused to press the sides (322d) through the elastic member (323) until the elastic member (223) completes transformation. When the elastic member (323) completes transformation at an outlet, an initial stiffness changes into a secondary stiffness, and a pressure from the outer peripheral part (321b) of the male component (321) starts being transmitted directly to the inner peripheral part (322a) of the female component (322).

By virtue of the above mechanism where the elastic member (323) and the sides (322d) abut on each other with time differences i.e. increase gradually in contact area therebetween with respect to a portion from an inlet (see (a) of FIG. 22) toward an outlet (see (c) of FIG. 22) when the male component (321) is rotated, an initial stiffness developed when the male component (321) is rotated increases gently so that the female component (322) can be rotated smoothly in a circumferential direction (each direction shown by a thick white arrow in (a) to (c) of FIG. 22). Subsequently, the elastic member (323) completes transformation at an outlet, and the outer peripheral part (321b) of the male component (321) starts transmitting pressure directly to the inner peripheral part (322a) of the female component (322), and therefore, an operator can rotate the female component (322)

by a desired angle in conjunction with the male component (321) so that a pinion gear (304) (see FIG. 19) can be rotated by a desired angle.

For the realization of such a mechanism, it is preferable that when the male component (321) is rotated in a state where it is inserted into the female component (322), a shifting range of the male component (321) in an axial direction is limited within a predetermined range such that a relative position gap of the male component (321) with respect to the female component (322) is not generated. It is further preferable that the male component (321) does not pull out of the female component (322).

(Features of Shaft Structure of Fourth Embodiment)

In the construction above, when the male component (321) is rotated in the initial state where it is inserted into the female component (322), the sides (322d) of the female spline parts (322b) and the elastic member (323) abut on each other with a predetermined time difference between: a position where gaps between the sides (322d) of the female spline parts (322b) and the elastic member (323) (first gaps S4 in a circumferential direction) are large (at an outlet in this embodiment, see (c) of FIG. 22); and a position where the gaps are small (at e.g. a midpoint in this embodiment, see (b) of FIG. 22). Accordingly, an initial stiffness (a stiffness developed until the elastic member (323) completes transformation, or a stiffness developed until the elastic member (323) completes absorption of a pressure from the male component (321)), when the male component (321) is rotated, is allowed to increase gently. Consequently, an initial stiffness when the male component (321) is rotated can be further reduced, in comparison with a conventional one, so as to suppress a sudden transmission of a large power to the shaft (303), thereby capable of preventing the operator's abnormal feelings of reduced control (abnormal feelings suffered from by the operator when the force required for the operator to handle the steering wheel (302) decreases drastically immediately after the operator starts handling the steering wheel (302)).

Further, in the construction above, the first gaps S4 in this embodiment are formed such that a clearance (e.g. S41, S42) between the sides (322d) of the female spline parts (322b) and the outer peripheral part (323b) of the elastic member (323) increases with increase in depth in an insertion direction of the male component (321). As a result, an elapsed period of time until the sides (322d) of the female spline parts (322b) abut on the elastic member (323) when the male component (321) is rotated can be made longer with increase in depth along an insertion direction of the male component (321) (toward an outlet side of the female component (322)). Consequently, when the male component (321) is rotated, the sides of the male spline parts (321c) are caused to press the sides (322d) of the female spline parts (322b), through the elastic member (323), with predetermined time differences, along a direction from an inlet side toward an outlet side, which results in surely achieving the advantageous effects of a gentle increase in stiffness from an initial stiffness when the male component (321) is rotated.

When the male component (321) is rotated in a state where it is inserted into the female component (322), a power of the rotation is transmitted to the female component (322) so as to transform the elastic member (323). During this movement, the elastic member (323) rubs abrasively against the inner peripheral part (322a) of the female component (322). Furthermore, such abrasive rubbing between the elastic member (323) and the inner peripheral part (322a) of the female component (322) occurs in a repetitive manner, every time the male component (321) is rotated to the right and left, and further, in a frequently changed direction. Under these conditions, if fabric covering the surface of the outer peripheral part (322b) of the male component (321) is an ordinary fabric without any treatment, it would soon wear away, which would raise a problem in torque transmission. In the fourth embodiment, when a rubber- or resin-impregnated fabric is used as the elastic member (323), by virtue of covering the outer peripheral part (321b) of the male component (321) with the fabric, the abrasion of the elastic member (323) can be reduced, and the life of the shaft structure (320) can be lengthened.

Specific constructions according to the present invention are not limited to the above embodiments described above with reference to the drawings. The scope of the present invention is not encompassed by the above explanations of the embodiment but particularly pointed out by the claims, and the equivalents of the claim recitations as well as all the modifications within the scope of the claims fall within the scope of the present invention.

For example, in the first to fourth embodiments, a structure in which, when the male component (21), (121), (221), (321) is rotated in the initial state where it is inserted into the female component (22), (122), (222), (322), the sides (22d), (122d), (222d), (322d) of the female spline parts (22b), (122b), (222b), (322b) and the elastic member (23), (123), (223), (323) abut on each other with predetermined time differences is not necessarily configured such that a clearance between the sides (22d), (122d), (222d), (322d) of the female spline parts (22b), (122b), (222b), (322b) and the elastic member (23), (123), (223), (323) is different along an insertion direction of the male component (21), (121), (221), (321). For example, even if a structure is configured such that: a clearance between the sides (22d), (122d), (222d), (322d) of the female spline parts (22b), (122b), (222b), (322b) and the elastic member (23), (123), (223), (323) is constant along an insertion direction of the male component (21), (121), (221), (321); and a cross-sectional diameter defined by the tops of the male spline parts (21c), (121c), (221c), (321c) is different along an insertion direction of the male component (21), (121), (221), (321), the elastic member (23), (123), (223), (323) and the sides (22d), (122d), (222d), (322d) of the female spline parts (22b), (122b), (222b), (322b) abut on each other with predetermined time differences when the male component (21), (121), (221), (321) is rotated in the above-described initial state. This is because a shifting length of the tops of the male spline parts (21c), (121c), (221c), (321c) in a circumferential direction is different between a portion whose diameter is relatively large and a portion whose diameter is relatively small, when the male component (21), (121), (221), (321) is rotated, and therefore, the sides (22d), (122d), (222d), (322d) of the female spline parts (22b), (122b), (222b), (322b) and the elastic member (23), (123), (223), (323) abut on each other earlier at a large-diameter portion in comparison with that at a small-diameter portion.

Figure 27:
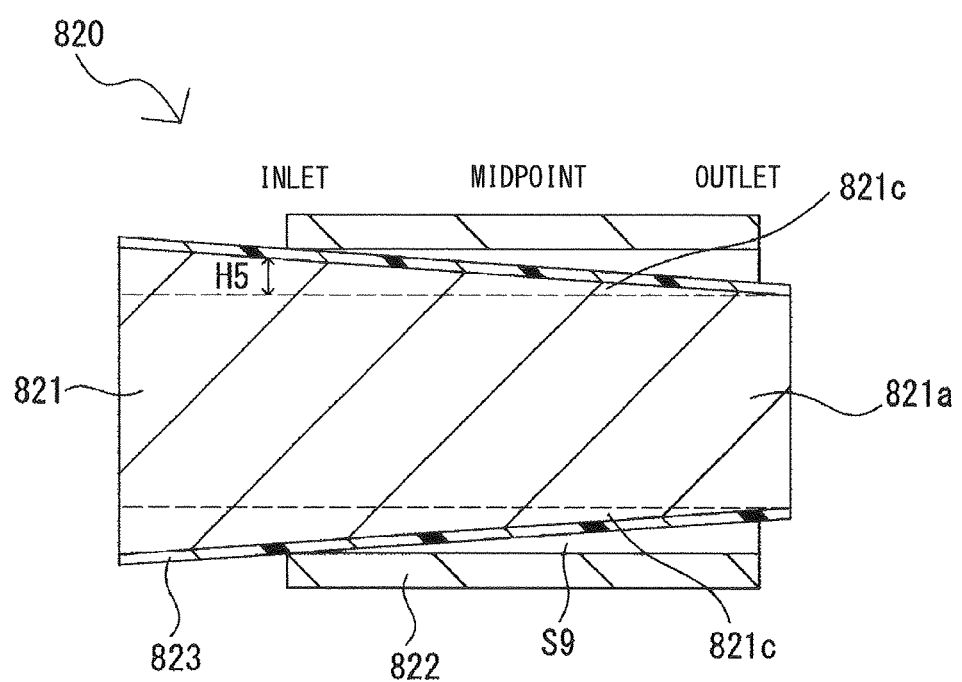
FIG. 27 depicts a view showing a modified example of the shaft structure as the first embodiment of the present invention.

In the first embodiment, the male spline parts (21c) are substantially the same in height H1 as each other in a radial direction over an axial direction of the male component (21) (see FIG. 3). The present invention, however, is not necessarily limited to such a structure. In a shaft structure (820) as a modified example of the first embodiment shown in FIG. 27, male spline parts (821c) formed around the axial core part (821a) in a substantially cylindrical shape may be configured such that a height H5 thereof in a radial direction decreases along a direction from an inlet toward an outlet, thereby generating first gaps S9 different in size in an circumferential direction of the female component (822)

along a direction from an inlet toward an outlet. The dashed lines in FIG. 27 indicate a boundary between the axial core part (821a) and the male spline parts (821c). In a similar manner, in the second embodiment, the male spline parts (121c) are substantially the same in height H2 as each other in a radial direction over an axial direction of the male component (121) (see FIG. 9). The present invention, however, is not necessarily limited to such a structure, and the male spline parts formed around the axial core part in a substantially cylindrical shape may be configured such that a height thereof in a radial direction decreases along a direction from an inlet toward an outlet, thereby generating second gaps different in size in an circumferential direction of the female component along a direction from an inlet toward an outlet.

Figure 28:
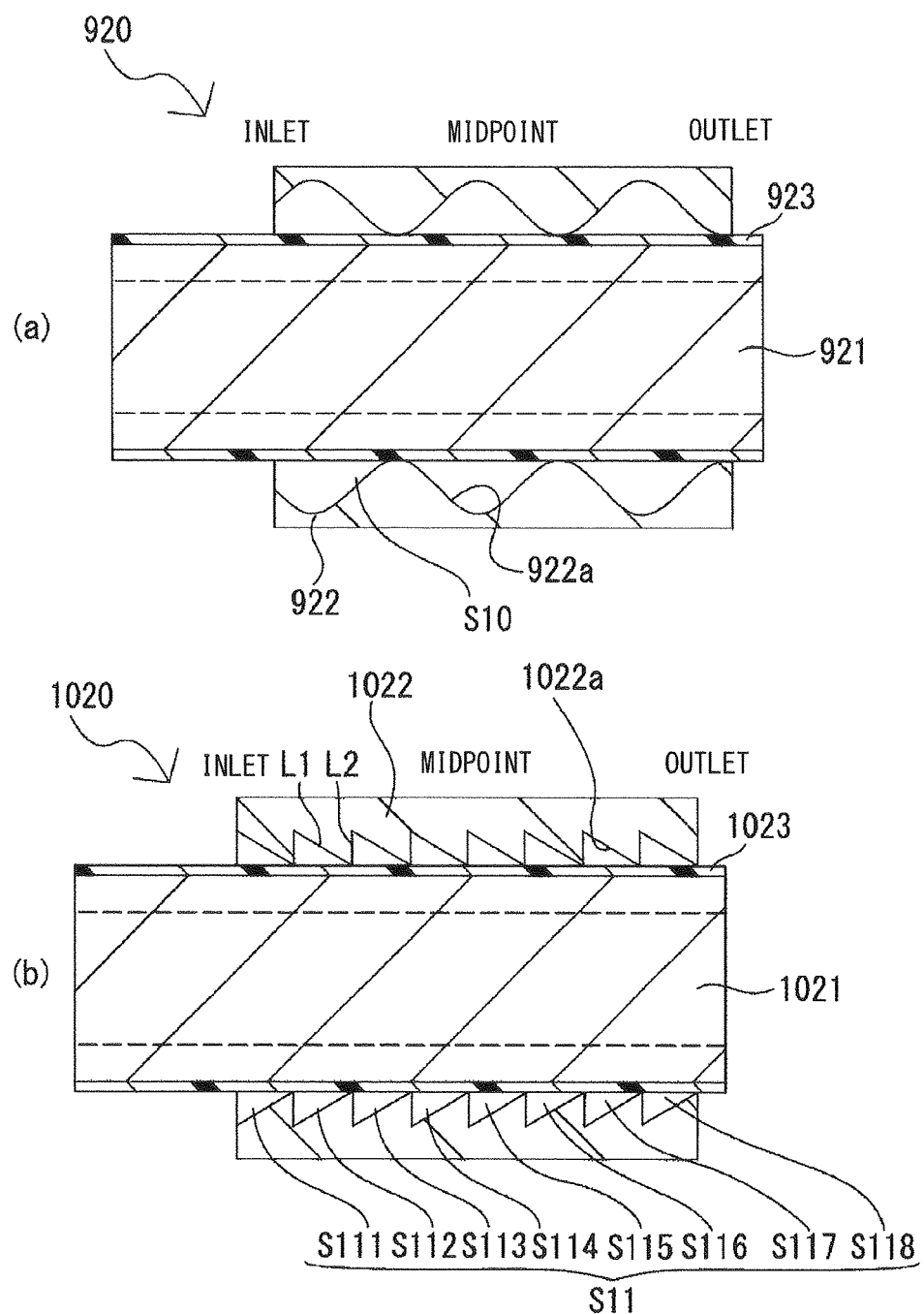
FIG. 28 depicts (a) a view showing a modified example of the shaft structure as the third embodiment of the present invention, and (b) a view showing another modified example of the shaft structure as the third embodiment of the present invention.

In the third embodiment, the inner peripheral part (222a) of the female component (222) has a tapered form narrowing along an insertion direction of the male component (221), and therefore, the first gaps S3 are formed so as to be different in size along a direction from an inlet toward an outlet (see FIG. 15). The present invention, however, is not necessarily limited to such an embodiment. In a shaft structure (920) as a modified example of the third embodiment in (a) of FIG. 28, the inner peripheral part (922a) of the female component (922) may be configured such that an axially cross-sectional shape thereof is wavy or jagged in a direction from an inlet toward an outlet, thereby generating first gaps S10 different in radially cross-sectional size in a circumferential direction of the female component (922) along a direction from an inlet toward an outlet. Further, in a shaft structure (1020) as another modified example of the third embodiment in (b) of FIG. 28, the inner peripheral part (1022a) of the female component (1022) may be configured such that an axially cross-sectional shape thereof is jagged, which is defined by crossed lines L1, L2, thereby generating first gaps S11 (defined as each gap S111-S118) different in radially cross-sectional size in a circumferential direction of the female component (1022) along a direction from an inlet toward an outlet. The gaps S111-S118 in (b) of FIG. 28 may be substantially similar in form to the gaps S3 (see FIG. 15). In a similar manner to the above for the modified example of forming an axially cross-sectional shape of the inner peripheral part of the female component into a wavy or jagged one to form the first gaps different in radially cross-sectional size along a direction from an inlet toward an outlet, the outer peripheral part of the male component may be configured such that an axially cross-sectional shape thereof is wavy or jagged, thereby generating first gaps different in radially cross-sectional size in a circumferential direction of the female component along a direction from an inlet toward an outlet.

In the first embodiment, the outer peripheral part (21b) of the male component (21) has a tapered form narrowing along an insertion direction of the male component (21), thereby generating the first gaps S1 different in radially cross-sectional size in a circumferential direction along a direction from an inlet toward an outlet (see FIG. 3). The present invention, however, is not necessarily limited to such a structure, and the outer peripheral part of the male component instead may have a form expanding along an insertion direction of the male component, thereby generating first gaps different in radially cross-sectional size in a circumferential direction along a direction from an inlet toward an outlet. In a similar manner, in the second embodiment, the outer peripheral part (121b) of the male component (121) has a tapered form narrowing along an insertion direction of the male component (121), thereby generating the second gaps S2 different in radially cross-sectional size in a circumferential direction along a direction from an inlet toward an outlet (see FIG. 9). The present invention, however, is not necessarily limited to such a construction, and the outer peripheral part of the male component instead may have a form expanding along an insertion direction of the male component, thereby generating second gaps different in radially cross-sectional size in a circumferential direction along a direction from an inlet toward an outlet.

In the third embodiment, the inner peripheral part (222a) of the female component (222) has a tapered form narrowing along an insertion direction of the male component (221), thereby generating the first gaps S3 different in radially cross-sectional size in a circumferential direction along a direction from an inlet to an outlet (see FIG. 15). The present invention is not necessarily limited to such a construction, and the inner peripheral part of the female component instead may have a form expanding along an insertion direction of the male component, thereby generating first gaps different in radially cross-sectional size in a circumferential direction along a direction from an inlet toward an outlet.

In the first embodiment, only the outer peripheral part (21b) of the male component (21) has a tapered form narrowing along an insertion direction of the male component (21), thereby generating first gaps S1 different in radially cross-sectional size in a circumferential direction along a direction from an inlet toward an outlet (see FIG. 3). The present invention, however, is not limited to such a structure, and each of the outer peripheral part of the male component and the inner peripheral part of the female component may have a tapered form narrowing or expanding along an insertion direction of the male component, thereby generating first gaps different in radially cross-sectional size in a circumferential direction along a direction from an inlet toward an outlet. In a similar manner, in the second embodiment, only the outer peripheral part (121b) of the male component (121) has a tapered form narrowing along an insertion direction of the male component (121), thereby generating the second gaps S2 different in radially cross-sectional size in a circumferential direction along a direction from an inlet toward an outlet (see FIG. 9). The present invention, however, is not limited to such a structure, and each of the outer peripheral part of the male component and the inner peripheral part of the female component may have a tapered form narrowing or expanding along an insertion direction of the male component, thereby generating second gaps different in radially cross-sectional size in a circumferential direction along a direction from an inlet toward an outlet.

In the third embodiment, only the inner peripheral part (222a) of the female component (222) has a tapered form narrowing along an insertion direction of the male component (221), thereby generating the first gaps S3 different in radially cross-sectional size in a circumferential direction along a direction from an inlet toward an outlet (see FIG. 15). The present invention, however, is not limited to such a structure, and each of the outer peripheral part of the male component and the inner peripheral part of the female component may have a tapered form narrowing or expanding along an insertion direction of the male component, thereby generating first gaps different in radially cross-sectional size in a circumferential direction along a direction from an inlet toward an outlet.

Figure 29:
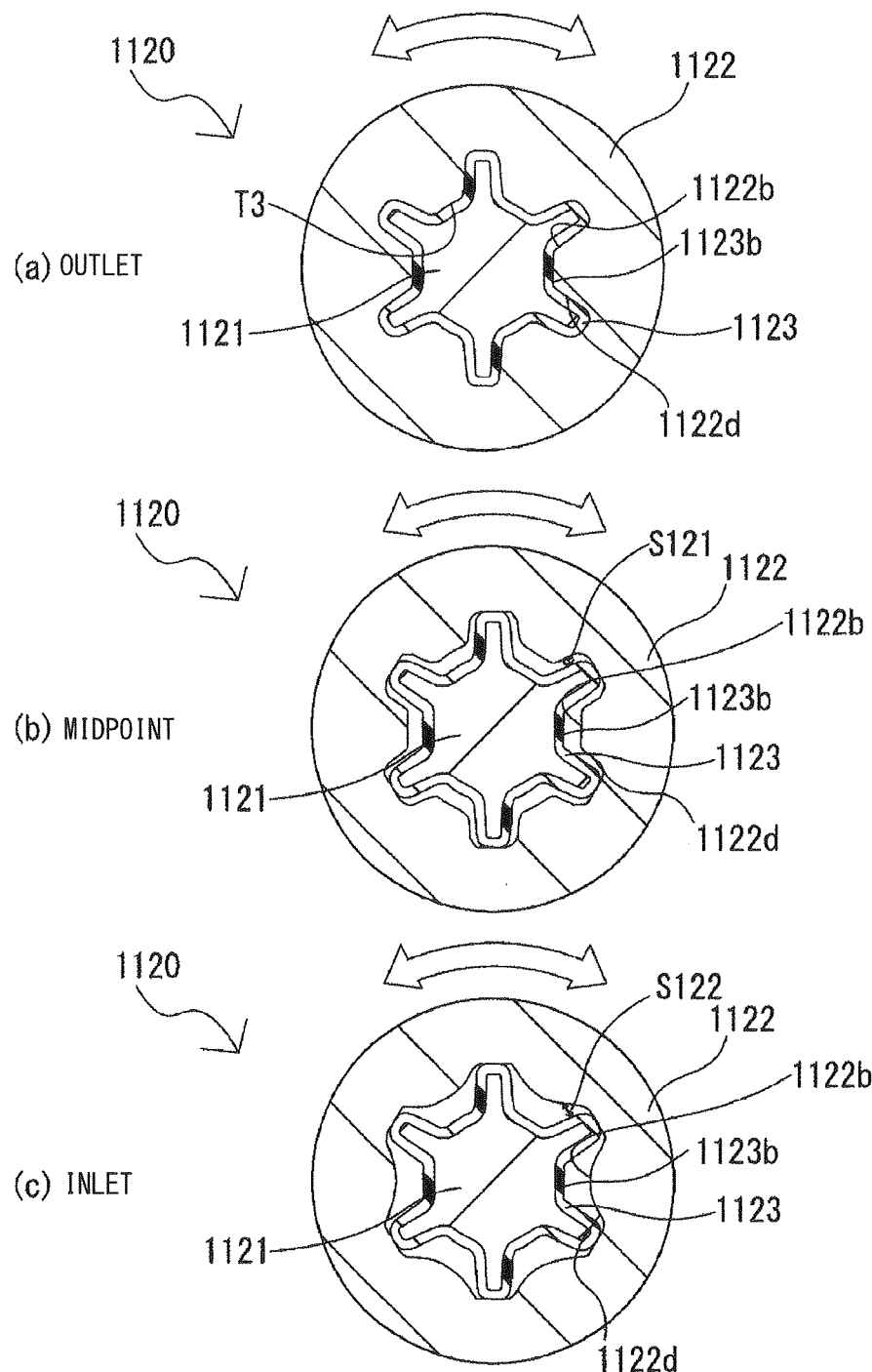
FIG. 29 depicts a view showing a modified example of the shaft structure as the fourth embodiment of the present invention.

In the fourth embodiment, the first gaps S4 (S41, S42) are generated by increasing a clearance between the sides (322d) of the female spline parts (322b) of the female component (322) and the outer peripheral part (323b) of the sides-facing elastic member (323) along an insertion direction (toward an outlet side of the female component (322)) of the male component (321). The present invention, however, is not limited to such a structure. In a shaft structure (1120) as a modified example of the fourth embodiment in (a) to (c) of FIG. 29, the first gaps may be generated by decreasing a clearance (S122, S121) between the sides (1122d) of the female spline parts (1122b) of the female component (1122) and the sides-facing outer peripheral part (1123b) of the elastic member (1123) along an insertion direction (toward an outlet side of the female component (1122)) of the male component (1121).

Figure 30:
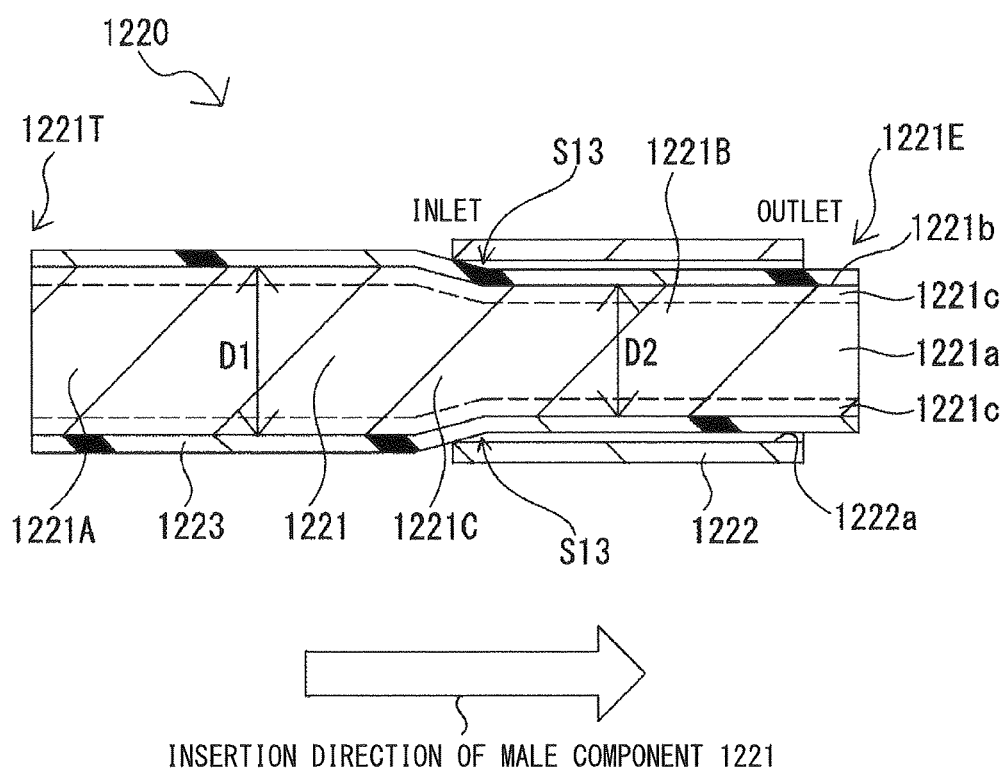
FIG. 30 depicts a view showing modified example 1 of the shaft structure as the first embodiment of the present invention in an initial state where the male component is inserted into the female component.

In the first embodiment, as shown in FIG. 3, the male component (21) has a tapered form as a whole narrowing along an insertion direction of the male component (21) (a direction shown by a thick white arrow in FIG. 3). The present invention, however, is not limited to such a structure, and the male component may have a tapered form only in part (see FIG. 30). FIG. 30 depicts a view showing modified example 1 of the shaft structure as the first embodiment in the initial state where the male component is inserted into the female component. More specifically, as the shaft structure (1220) shown in FIG. 30, the male component (1221) may include a first main body (1221A), a second main body (1221B), a first tapered part (1221C) capable of connecting the first main body (1221A) and the second main body (1221B), and an elastic member (1223) for covering the outer peripheral part (1221b) of the respective parts (1221A)-(1221C) so that only the first tapered part (1221C) has a tapered form narrowing from a front side (1221T) to a back side (1221E). The first tapered part (1221C) may be formed by C chamfering or R chamfering. In processing of C chamfering, the edges or corners of the object are cut off so as to make a flat peripheral part. In processing of R chamfering, the edges or corners of the object are rounded. As shown in FIG. 30, the first main body (1221A) is arranged on the front side (1221T) and has a substantially constant diameter D1 from a front end to a back end. The second main body (1221B) has a substantially constant diameter D2, which is smaller than D1, from the front end to the back end. In the initial state where the male component (1221) is inserted into the female component (1222), first gaps S13 are generated between the sides of the female spline parts and the sides-facing elastic member (1223), which covers the sides of the male spline parts (1221c), on the first tapered part (1221C). The reference numerals (1221a) and (1222a) in FIG. 30, in a similar manner to that in the first embodiment, indicate the axial core part of the male component and the inner peripheral part of the female component, respectively. In modified example 1 shown in FIG. 30, the male component (1221) does not have a tapered form as a whole narrowing from the front side to the back side but has a tapered form only in part as the first tapered part (1221C) capable of connecting the first main body (1221A) and the second main body (1221B), and in addition, the second main body (1221B) extends in a straight manner, while having a substantially constant diameter D2 from the front end to the back end. Therefore, when the male component (1221) is rotated, the sides of the male spline parts (1221c) press the sides of the female spline parts through the elastic member (1223) so that the resulting stress can be dispersed over the second main body (1221B) extending in a straight manner. Accordingly, there can be relaxed in the event that a stress is generated by a pressure of the sides of the male spline parts on the sides of female spline parts through the elastic member, and is concentrated on a part of the male or female spline parts (more specifically, the sides of the male spline parts or the sides of the female spline parts), in a circumstance where the male component is tapered as a whole, which would result in a decrease in the durability of the shaft structure. Modified example 1 in FIG. 30 can improve the durability of the shaft structure (1220) in comparison with a conventional one.

The shaft structure (1220) (see FIG. 30) may be further modified. In modified example 2 of the shaft structure (1320) as the first embodiment in FIG. 31, the male component (1321) may include a second tapered part (1321D) narrowing from the back end of the second main body (1321B) so that, in the initial state where the male component (1321) is inserted into the female component (1322), first gaps S14 are generated between the sides of the female spline parts and the sides-facing elastic member (1323), which covers the sides of the male spline parts (1321c), on the second tapered part (1321D). The second tapered part (1321D) may be formed by C chamfering or R chamfering.

Figure 31:
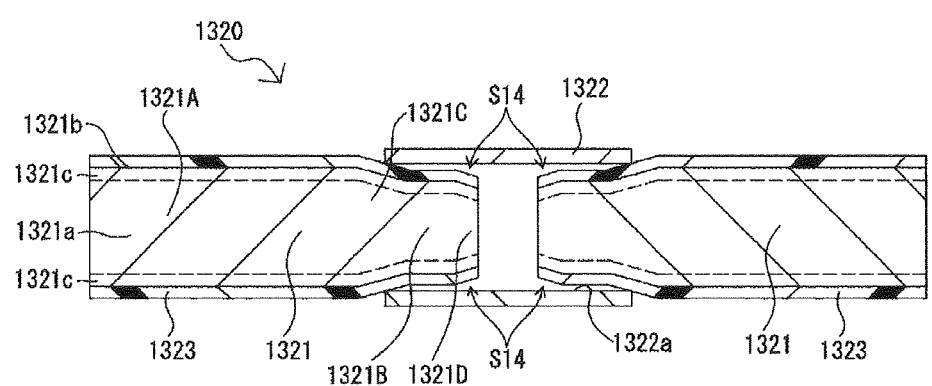
FIG. 31 depicts a view showing modified example 2 of the shaft structure as the first embodiment of the present invention in an initial state where the male component is inserted into the female component.

FIG. 31 shows an example of how the shaft structure (1320) is used as a product. In modified example 2, the female component (1322) is arranged between a pair of male components (1321) so that a part of one male component is inserted into an inlet of the female component (1322), and a part of the other male component is inserted into an outlet of the female component (1322) (the parts to be inserted here include the second tapered part (1321D), the second main body (1321B), and a portion positioned midway on the first tapered part (1321C)). Note that FIG. 31 shows the pair of male components (1321), which do not require separate explanations for each male component, in a manner that one is given a full set of reference numerals (on the left) and the other not (on the right) for simple illustration. The reference numerals (1321A), (1321a), (1321b), and (1322a) in FIG. 31 indicate the first main body of the male component, the axial core part of the male component, the outer peripheral part of the male component, and the inner peripheral part of the female component, respectively. In modified example 2 shown in FIG. 31, if either one of the coaxial male and female components (1321), (1322) deviates from the central axis due to a position gap, the inner peripheral part (1322a) of the female component (1322) abuts on the elastic member (1323) both on a part of the first tapered part (1321C) and second tapered part (1321D), thereby enabling a concentrated stress to be further relaxed in comparison with the case of only the first tapered part.

Figure 32:
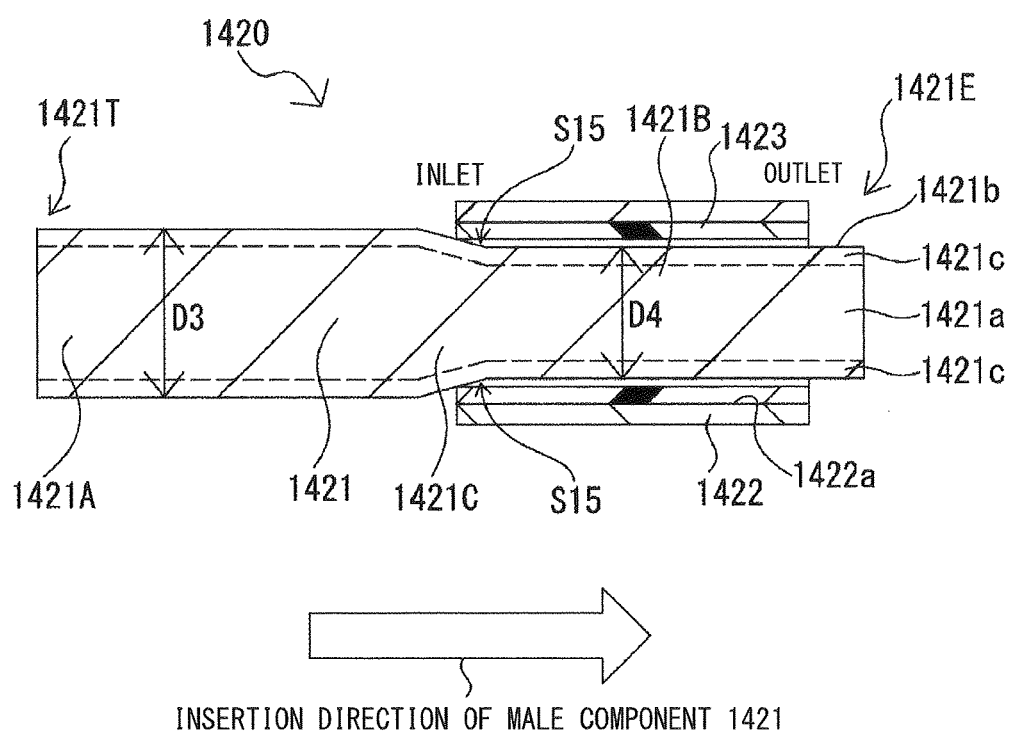
FIG. 32 depicts a view showing modified example 1 of the shaft structure as the second embodiment of the present invention in an initial state where the male component is inserted into the female component.

In the second embodiment, as shown in FIG. 9, the male component (121) has a tapered form as a whole narrowing along an insertion direction of the male component (121) (a direction shown by a thick white arrow in FIG. 9). The present invention, however, is not limited to such a structure, and the male component may have a tapered form only in part (see FIG. 32). FIG. 32 depicts a view showing modified example 1 of the shaft structure as the second embodiment in the initial state where the male component is inserted into the female component. More specifically, as the shaft structure (1420) shown in FIG. 32, the male component (1421) may include a third main body (1421A), a fourth main body (1421B), and a third tapered part (1421C) capable of connecting the third main body (1421A) and the fourth main body (1421B), and an elastic member (1423) may be arranged so as to cover a surface of the inner peripheral part (1422a) of the female component (1422), and only the third tapered part (1421C) may have a tapered form narrowing from a front side (1421T) to a back side (1421E) of the male component (1421). The third tapered part (1421C) may be formed by C chamfering or R chamfering. The third main body (1421A) is arranged on the front side (1421T) and has a substantially constant diameter D3 from a front end to a back end. The fourth main body (1421B) has a substantially constant diameter D4, which is smaller than D3, from the front end to the back end. In the initial state where the male component (1421) is inserted into the female component (1422), second gaps S15 are generated between the sides of the male spline parts (1421c) and the sides-facing elastic member (1423), which covers the sides of the female spline parts, on the third tapered part (1421C). The reference numerals (1421a) and (1421b) in FIG. 32, in a similar manner to that in the second embodiment, indicate the axial core part of the male component and the outer peripheral part of the male component, respectively. In modified example 1 shown in FIG. 32, the male component (1421) does not have a tapered form as a whole narrowing from the front side to the back side but has a tapered form only in part as the third tapered part (1421C) capable of connecting the third main body (1421A) and the fourth main body (1421B), and in addition, the fourth main body (1421B) extends in a straight manner, while having a substantially constant diameter D4 from the front end to the back end. Therefore, when the male component (1421) is rotated, and the sides of the male spline parts (1421c) press the sides of the female spline parts through the elastic member (1423) so that the resulting stress can be dispersed over the fourth main body (1421B) extending in a straight manner. Accordingly, there can be relaxed the event that a stress is generated by a pressure of the sides of the male spline parts on the sides of female spline parts through the elastic member, and is concentrated on a part of the male or female spline parts (more specifically, the sides of the male spline parts or the sides of the female spline parts), in a circumstance where the male component is tapered as a whole, which would result in a decrease in the durability of the shaft structure. Modified example 1 in FIG. 32 can improve the durability of the shaft structure (1420) in comparison with a conventional one.

The shaft structure (1420) (see FIG. 32) may be further modified. In modified example 2 of the shaft structure (1520) as the second embodiment (see FIG. 33), the male component (1521) may include a fourth tapered part (1521D) narrowing from the back end of the fourth main body (1521B) so that, in the initial state where the male component (1521) is inserted into the female component (1522), second gaps S16 are generated between the sides of the male spline parts (1521c) and the sides-facing elastic member (1523), which covers the sides of the female spline parts, on the fourth tapered part (1521D). The fourth tapered part (1521D) may be formed by C chamfering or R chamfering.

Figure 33:
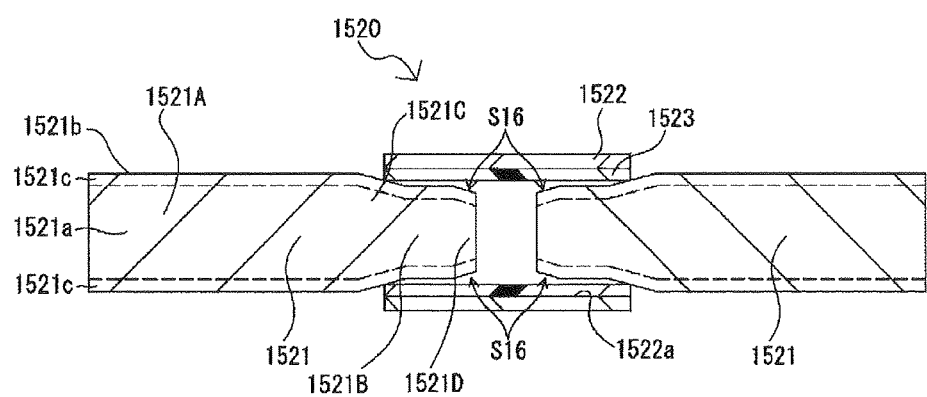
FIG. 33 depicts a view showing modified example 2 of the shaft structure as the second embodiment of the present invention in an initial state where the male component is inserted into the female component.

FIG. 33 shows an example of how the shaft structure (1520) is used as a product. In modified example 2, the female component (1522) is arranged between a pair of male components (1521) so that a part of one male component is inserted into an inlet of the female component (1522), and a part of the other male component is inserted into the outlet of the female component (1522) (the parts to be inserted here include the fourth tapered part (1521D), the fourth main body (1521B), and a portion positioned midway on the third tapered part (1521C)). Note that FIG. 33 shows the pair of male components (1521), which do not require separate explanations for each male component, in a manner that one is given a full set of reference numerals (on the left) and the other not (on the right) for simple illustration. The reference numerals (1521A), (1521a), (1521b), and (1522a) in FIG. 33 indicate the third main body of the male component, the axial core part of the male component, the outer peripheral part of the male component, and the inner peripheral part of the female component, respectively. In modified example 2 shown in FIG. 33, if either one of the coaxial male and female components (1521), (1522) deviates from the central axis due to a position gap, the elastic member (1523) on the inner peripheral part (1522a) of the female component (1522) abuts on both the third and fourth tapered parts (1521C), (1521D), thereby enabling a concentrated stress to be further relaxed in comparison with a case of only the third tapered part (1521C).

REFERENCE NUMERALS

1, 101, 201, 301 Electric power steering device
2, 102, 202, 302 Steering wheel
3, 103, 203, 303 Steering shaft (shaft)
4, 104, 204, 304 Pinion gear
5, 105, 205, 305 Rack gear
6, 106, 206, 306 Rack shaft
7, 107, 207, 307 Tie rods
8, 108, 208, 308 Wheels
9, 109, 209, 309 Input shaft
10, 110, 210, 310 Output shaft
11, 111, 211, 311 Torsion bar
12, 112, 212, 312 Torque sensor
13, 113, 213, 313 Control part
14, 114, 214, 314 Driver
15, 115, 215, 315 Electric motor
17, 117, 217, 317 Speed reducer
18, 118, 218, 318 Converter
20, 120, 220, 320, 420, 520, 620, 720, 820, 920, 1020, 1120, 1220, 1320, 1420, 1520 Shaft structure
21, 121, 221, 321, 421, 521, 621, 721, 821, 921, 1021, 1121, 1221, 1321, 1421, 1521 Male component(s)
21a, 121a, 221a, 321a, 721a, 821a, 1221a, 1321a, 1421a, 1521a Axial core part
21b, 121b, 221b, 321b, 1221b, 1321b, 1421b, 1521b Outer peripheral part
21c, 121c, 221c, 321c, 521c, 621c, 721c, 821c, 1221c, 1321c, 1421c, 1521c Male spline parts
21d, 121d, 221d, 321d, 621d, 721d Male spline bottom parts
22, 122, 222, 322, 422, 522, 622, 722, 822, 922, 1022, 1122, 1222, 1322, 1422, 1522 Female component
22a, 122a, 222a, 322a, 822a, 922a, 1022a, 1222a, 1322a, 1422a, 1522a Inner peripheral part
22b, 122b, 222b, 322b, 422b, 522b, 1122b Female spline parts
22c, 122c, 222c, 322c, 422c, 522c Female spline bottom parts
22d, 121e, 222d, 322d, 422d, 521e, 522d, 621e, 721e, 1122d Sides
23, 123, 223, 323, 423, 523, 623, 723, 823, 923, 1023, 1123, 1223, 1323, 1423, 1523 Elastic member
23a, 123a, 223a, 323a, 523a, 623a, 723a Inner peripheral part
23b, 123b, 223b, 323b, 423b, 523b, 1123b Outer peripheral part
1221A, 1321A First main body
1221B, 1321B Second main body
1221C, 1321C First tapered part
1321D Second tapered part
1221E, 1421E Back side
1221T, 1421T Front side
1421A, 1521A Third main body
1421B, 1521B Fourth main body 1421C, 1521C Third tapered part
1521D Fourth tapered part
D1-D4 Diameter
H1-H5 Height
L1, L2 Lines
S1-S16, S21, S22, S31, S32, S41, S42, S111-S118, S121, S122 Gaps
T1-T6 Tops

The invention claimed is:

1. A shaft structure installed in a shaft capable of making a power-transmission, the shaft structure comprising:
   a male component having a plurality of male spline parts and a plurality of male spline bottom parts formed on an outer peripheral part thereof;
   a female component having a plurality of female spline parts and a plurality of female spline bottom parts formed on an inner peripheral part thereof, the female component configured to allow the male component to be slidably inserted thereinto in an axial direction thereby making up said shaft structure; and
   an elastic member arranged on the male component such that a surface of the outer peripheral part of the male component is covered with the elastic member, wherein said shaft structure is configured such that
      in an initial state where the male component is inserted into the female component, the female and male components have first gaps generated between: sides of the plurality of female spline parts; and sides-facing portions of the elastic member, and
      when the male component is rotated with respect to the female component, a period of time, which elapses from the initial state to a state where the sides of the plurality of female spline parts and the portions of the elastic member abut on each other, has predetermined time differences along the axial direction.

2. The shaft structure according to claim 1 wherein the first gaps are generated such that a clearance between: the sides of the plurality of female spline parts; and the elastic member is different along a direction in which the male component is inserted into the female component.

3. The shaft structure according to claim 2 wherein the male component further comprises:
   a first main body formed at a front side to have a substantially constant diameter while extending in a direction from a front end to a back end;
   a second main body formed at a back side to have a substantially constant diameter smaller than a diameter of the first main body while extending in a direction from the front end to the back end; and
   a first tapered part having a diameter smaller in a tapered manner from the front side toward the back side formed so as to connect the first main body and the second main body, wherein
   in the initial state where the male component is inserted into the female component, the first gaps are generated between: the elastic member covering the sides of the plurality of male spline parts on the first tapered part; and the elastic-member-facing sides of the plurality of female spline parts.

4. The shaft structure according to claim 3 wherein the male component further comprises a second tapered part having a diameter smaller in a tapered manner from the front side toward the back side formed further at the back end of the second main body, wherein in the initial state where the male component is inserted into the female component, the first gaps are generated between: the elastic member covering the sides of the plurality of male spline parts on the second tapered part; and the elastic-member-facing sides of the plurality of female spline parts.

5. The shaft structure according to claim 4 wherein a pair of male components, as the male component, are arranged such that the female component in a cylindrical form is interposed between the pair of male components, and a part of one of the pair of male components is inserted into an inlet side of the female component while a part of the other of the pair of male components is inserted into an outlet side of the female component.

6. The shaft structure according to claim 5 wherein the elastic member is made of fabric impregnated with rubber or resin.

7. The shaft structure according to claim 4 wherein the elastic member is made of fabric impregnated with rubber or resin.

8. The shaft structure according to claim 3 wherein the elastic member is made of fabric impregnated with rubber or resin.

9. The shaft structure according to claim 2 wherein the elastic member is made of fabric impregnated with rubber or resin.

10. The shaft structure according to claim 1 wherein the elastic member is made of fabric impregnated with rubber or resin.

11. A male component installed in a shaft capable of making a power-transmission, the male component comprising:
    a plurality of male spline parts formed on an outer peripheral part thereof;
    a plurality of male spline bottom parts on an outer peripheral part thereof; and
    an elastic member arranged thereon such that a surface of outer peripheral parts of the plurality of male spline parts and the plurality of male spline bottom parts is covered with the elastic member, wherein
    said male component is configured to be inserted into a female component in an axial direction thereby making up a shaft structure, the female component having a plurality of female spline parts and a plurality of female spline bottom parts formed on an inner peripheral part thereof, and wherein said male component is further configured such that
       in an initial state where said male component is inserted into the female component, the female component and said male component have first gaps generated between: sides of the plurality of female spline parts; and sides-facing portions of the elastic member, and
       when said male component is rotated with respect to the female component, a period of time, which elapses from the initial state to a state where the sides of the plurality of female spline parts and the portions of the elastic member abut on each other, has predetermined time differences along the axial direction.

12. The male component according to claim 11 wherein the first gaps are generated such that a clearance between: the sides of the plurality of female spline parts; and the elastic member is different along a direction in which the male component is inserted into the female component.

13. The male component according to claim 12 wherein the male component further comprises:
    a first main body formed at a front side to have a substantially constant diameter while extending in a direction from a front end to a back end;
    a second main body formed at a back side to have a substantially constant diameter smaller than a diameter of the first main body while extending in a direction from the front end to the back end; and a first tapered part having a diameter smaller in a tapered manner from the front side toward the back side formed so as to connect the first main body and the second main body, wherein in the initial state where the male component is inserted into the female component, the first gaps are generated between: the elastic member covering the sides of the plurality of male spline parts on the first tapered part; and the elastic-member-facing sides of the plurality of female spline parts.

14. The male component according to claim 13 wherein the male component further comprises a second tapered part having a diameter smaller in a tapered manner from the front side toward the back side formed further at the back end of the second main body, wherein in the initial state where the male component is inserted into the female component, the first gaps are generated between: the elastic member covering the sides of the plurality of male spline parts on the second tapered part; and the elastic-member-facing sides of the plurality of female spline parts.

15. The male component according to claim 14 wherein the elastic member is made of fabric impregnated with rubber or resin.

16. The male component according to claim 13 wherein the elastic member is made of fabric impregnated with rubber or resin.

17. The male component according to claim 12 wherein the elastic member is made of fabric impregnated with rubber or resin.

18. The male component according to claim 11 wherein the elastic member is made of fabric impregnated with rubber or resin.

19. A shaft structure installed in a shaft capable of making a power-transmission, the shaft structure comprising:
   a male component having a plurality of male spline parts and a plurality of male spline bottom parts formed on an outer peripheral part thereof;
   a female component having a plurality of female spline parts and a plurality of female spline bottom parts formed on an inner peripheral part thereof, the female component configured to allow the male component to be slidably inserted thereinto in an axial direction thereby making up said shaft structure; and
   an elastic member arranged on the female component such that a surface of the inner peripheral part of the female component is covered with the elastic member, wherein said shaft structure is configured such that
   in an initial state where the male component is inserted into the female component, the female and male components have second gaps generated between: sides of the plurality of male spline parts; and sides-facing portions of the elastic member, and when the male component is rotated with respect to the female component, a period of time, which elapses from the initial state to a state where the sides of the plurality of male spline parts and the portions of the elastic member abut on each other, has predetermined time differences along the axial direction.

20. The shaft structure according to claim 19 wherein the second gaps are generated such that a clearance between: the sides of the plurality of male spline parts; and the elastic member is different along a direction in which the male component is inserted into the female component.

21. The shaft structure according to claim 20 wherein the male component further comprises:

a third main body formed at a front side to have a substantially constant diameter while extending in a direction from a front end to a back end;

a fourth main body formed at a back side to have a substantially constant diameter smaller than a diameter of the third main body while extending in a direction from the front end to the back end; and a third tapered part having a diameter smaller in a tapered manner from the front side toward the back side formed so as to connect the third main body and the fourth main body, wherein in the initial state where the male component is inserted into the female component, the second gaps are generated between: the elastic-member-facing sides of the plurality of male spline parts on the third tapered part; and the elastic member covering the sides of the plurality of female spline parts.

22. The shaft structure according to claim 21 wherein the male component further comprises a fourth tapered part having a diameter smaller in a tapered manner from the front side toward the back side formed further at the back end of the fourth main body, wherein in the initial state where the male component is inserted into the female component, the second gaps are generated between: the elastic-member-facing sides of the plurality of male spline parts on the fourth tapered part; and the elastic member covering the sides of the plurality of female spline parts.

23. The shaft structure according to claim 22 wherein a pair of male components, as the male component, are arranged such that the female component in a cylindrical form is interposed between the pair of male components, and a part of one of the pair of male components is inserted into an inlet side of the female component while a part of the other of the pair of male components is inserted into an outlet side of the female component.

24. The shaft structure according to claim 23 wherein the elastic member is made of fabric impregnated with rubber or resin.

25. The shaft structure according to claim 22 wherein the elastic member is made of fabric impregnated with rubber or resin.

26. The shaft structure according to claim 21 wherein the elastic member is made of fabric impregnated with rubber or resin.

27. The shaft structure according to claim 20 wherein the elastic member is made of fabric impregnated with rubber or resin.

28. The shaft structure according to claim 19 wherein the elastic member is made of fabric impregnated with rubber or resin.

29. A female component installed in a shaft capable of making a power-transmission, the female component comprising:
   a plurality of female spline parts formed on an inner peripheral part thereof;
   a plurality of female spline bottom parts formed on an inner peripheral part thereof; and
   an elastic member arranged thereon such that a surface of inner peripheral parts of the plurality of female spline parts and the plurality of female spline bottom parts is covered with the elastic member, wherein
   said female component is configured to allow a male component to be inserted thereinto in an axial direction thereby making up a shaft structure, the male component having a plurality of male spline parts and a plurality of male spline bottom parts formed on an outer peripheral part thereof, and wherein said female component is further configured such that in an initial state where the male component is inserted into said female component, said female component and the male component have second gaps generated between: sides of the plurality of male spline parts; and sides-facing portions of the elastic member, and when the male component is rotated with respect to said female component, a period of time, which elapses from the initial state to a state where the sides of the plurality of male spline parts and the portions of the elastic member abut on each other, has predetermined time differences along the axial direction.

30. The female component according to claim 29 wherein the second gaps are generated such that a clearance between: the sides of the plurality of male spline parts; and the elastic member is different along a direction in which the male component is inserted into the female component.

31. The female component according to claim 30 wherein the elastic member is made of fabric impregnated with rubber or resin.

32. The female component according to claim 29 wherein the elastic member is made of fabric impregnated with rubber or resin.

* * * * *